(12) United States Patent
Young et al.

(10) Patent No.: US 6,471,743 B1
(45) Date of Patent: Oct. 29, 2002

(54) METHODS FOR LEACHING OF ORES

(75) Inventors: Tom L. Young; Michael G. Greene, both of Tucson; Dennis R. Rice, Oracle; Kelly L. Karlage; Sean P. Premeau, both of Tucson, all of AZ (US)

(73) Assignee: MBX Systems, Inc., Tucson, AZ (US)

( * ) Notice: Subject to any disclaimer, the term of this patent is extended or adjusted under 35 U.S.C. 154(b) by 0 days.

(21) Appl. No.: 09/507,547

(22) Filed: Feb. 18, 2000

Related U.S. Application Data

(60) Provisional application No. 60/120,820, filed on Feb. 19, 1999.

(51) Int. Cl.[7] .................................................. C22B 3/10
(52) U.S. Cl. ........................... 75/739; 75/741; 75/743; 75/744; 423/82; 423/84; 423/85; 423/86
(58) Field of Search ...................... 423/85, 82, 84, 423/86; 75/739, 740, 741, 743, 744

(56) References Cited

U.S. PATENT DOCUMENTS

| | | | |
|---|---|---|---|
| 3,091,515 A | | 5/1963 | Dantro et al. |
| 3,218,131 A | | 11/1965 | Grose |
| 4,552,730 A | | 11/1985 | Shirts et al. |
| 4,606,764 A | * | 8/1986 | Hazen et al. .................. 423/26 |
| 5,096,486 A | * | 3/1992 | Anderson et al. ............. 75/734 |
| 5,411,574 A | * | 5/1995 | Turney et al. ................. 75/743 |
| 5,826,162 A | * | 10/1998 | Aral et al. ..................... 423/20 |
| 6,090,354 A | * | 7/2000 | Russell et al. ................. 423/82 |
| 6,139,602 A | * | 10/2000 | Sharp et al. ................... 75/711 |

FOREIGN PATENT DOCUMENTS

| | | |
|---|---|---|
| EP | 0186370 | 7/1986 |
| EP | 0547744 | 6/1993 |
| GB | 409847 | 1/1933 |
| WO | 9524510 | 9/1995 |
| WO | 9624555 | 8/1996 |

OTHER PUBLICATIONS

Jin, Zoumei, Lisheng Wang, Huinan Zhou, Zhaoyu Duan [1997] "Selective Dissolution Kinetics of the Ilmenite" (B. Mishra and G.J. Kiporous, eds) In: Titanium Extract and Process, The Mineral, Metals & Materials Society, pg. 122–128, No Month.

* cited by examiner

*Primary Examiner*—Roy King
*Assistant Examiner*—Tima McGuthry-Banks
(74) *Attorney, Agent, or Firm*—Saliwanchik, Lloyd & Saliwanchik

(57) ABSTRACT

Disclosed and claimed are efficient methods for leaching minerals from ores using an acidic solution such as sulfuric acid. Additional factors which can improve mineral recovery include the use of an alkali metal halide, grinding the ore, addition of a carbon source, and/or, adjustment of the temperature at which the process is carried out. Minerals such as titanium, iron, nickel, cobalt, silver and gold may be recovered by the methods of the present invention.

111 Claims, 8 Drawing Sheets

-□- Nickel without Amh    -●- Nickel with Amh

-□- Cobalt without Amh    -●- Cobalt with Amh

METHODS FOR LEACHING OF ORES

CROSS-REFERENCE TO RELATED APPLICATION

This application claims the benefit of the filing date of provisional application U.S. Ser. No. 60/120,820 filed Feb. 19, 1999.

BACKGROUND OF THE INVENTION

Oxides of cobalt (Co), nickel (Ni), titanium (Ti), copper (Cu), molybdenum (Mo), lead (Pb), zinc (Zn), gold (Au), and silver (Ag) are important minerals. Various methods exist for recovering these compounds from the ores where they are found. For example, autoclave methods are often used to recover Co, Ni and Ti oxides. These methods are capital and labor intensive. Mo oxide has been leached by hydrochloric acid methods. Cyanide, thiosulfate, thiourea and halides are used in leaching Au and Ag metals and oxides. Cu. Zn and Pb can be leached with sulfuric acid.

Rutile ($TiO_2$) is a mineral used for many purposes. Amongst other uses, it is a source of titanium metal and a paint pigment. Synthetic rutile is generally considered as any rutile created from another mineral, usually ilmenite, that has at least 90% $TiO_2$. High purity rutile is 99.9%+$TiO_2$. High purity rutile generally carries a commercial value premium.

Ilmenite ($FeTiO_3$) is most often converted to synthetic rutile by. high temperature leaching with hydrochloric acid in an autoclave. Leaching temperatures are generally between 800 to 900° C. Ferric chloride is sometimes used in these autoclave leaches to increase the reaction rates at the lower temperatures.

Zoumei Jin el al. (B. Mishra and G. J. Kiporous eds, In: *Titanium Extraction and Processing,* The Mineral, Metals & Materials Society (1997) pg 122–128) reported that 4 to 6 Normal hydrochloric acid at 110 to 140° C., will dissolve the iron (Fe) from Ilmenite from the Sichuan province of China in 6 hours. They found that the reaction rate is 0.4 order with respect to initial $Fe^{-2}$ concentration. They postulate a surface reaction control model with an apparent activation energy of 56.97 kilojoules per mol.

Conventional autoclave technology is capital, maintenance and energy intensive. The process disclosed in Zoumei Jin et al. process involves the use of large amounts of hydrochloric acid, which is expensive, difficult to handle and requires special stainless steel equipment. There is a clear need for more efficient processes for leaching of ores to obtain valuable minerals.

Cyanide is the most commonly used leachant for gold. Two molecules of cyanide complex with every molecule of gold. Copper also complexes with cyanide, but it takes 4 molecules of cyanide for every copper molecule. Copper is often present in copper gold ores in the one tenth to one percent range. Gold in these ores is in the one to 10 parts per million range. The copper consumes so much cyanide it needs to be recovered by hydrogen cyanide distillation, an expensive and dangerous operation. Systems have been proposed where sulfuric acid is used to leach the copper first. Then, the heap or batch is neutralized. Cyanide can then be used to leach the gold. The problem, of course, is the expense of neutralization. In heap operations, the additional worry of incomplete neutralization is present.

In other ores, the gangue, or unwanted material, can be an acid consumer. Copper oxide in limestone rich rock is an example.

BRIEF SUMMARY OF THE INVENTION

The subject invention pertains to novel and highly efficient methods for leaching valuable minerals, such as cobalt (Co), nickel (Ni), titanium (Ti), copper (Cu), molybdenum (Mo), lead (Pb), zinc (Zn), gold (Au), and silver (Ag) from ores.

One aspect of the present invention concerns methods for recovering titanium from ores. One embodiment of the subject method uses an acidic solution, such as sulfuric acid, to leach titanium oxides from a mineral feed. Additional modifications and/or steps, including, for example, grinding of the ore, addition of an alkali metal halide, addition of a carbon source, and adjustment of pressure and/or temperature, can be incorporated in the process. In a preferred embodiment, a mineral feed is contacted with an acid and an alkali metal halide to leach titanium oxides from the feed. High purity titanium dioxide having a commercial premium over synthetic rutile can be produced using the methods of the subject invention.

Another aspect of the present invention concerns methods for recovering transition metals other than titanium from ores. In one embodiment, the present invention provides a method for recovery of nickel and cobalt from a mineral feed by leaching the feed with an acidic solution. In an exemplified embodiment, a mixture of sulfuric acid and an alkali metal halide are used to leach out cobalt and nickel from a laterite ore. The subject methods can also be used to recover cobalt, nickel, copper, etc. by leaching these elements from scrap metal.

The subject invention also concerns methods for recovering multiple metals or metal oxides in separate solutions. In one embodiment, ore is contacted with an acid solution, such as sulfuric acid. Solid residue is then collected and contacted with an alkali metal halide and acid solution. In an exemplified embodiment, the subject method is used to recover copper separately from gold and silver. The copper is recovered primarily in the first acid solution, while the gold and silver are recovered in the alkali metal halide and acid solution.

DETAILED DISCLOSURE OF THE INVENTION

Figure 1:
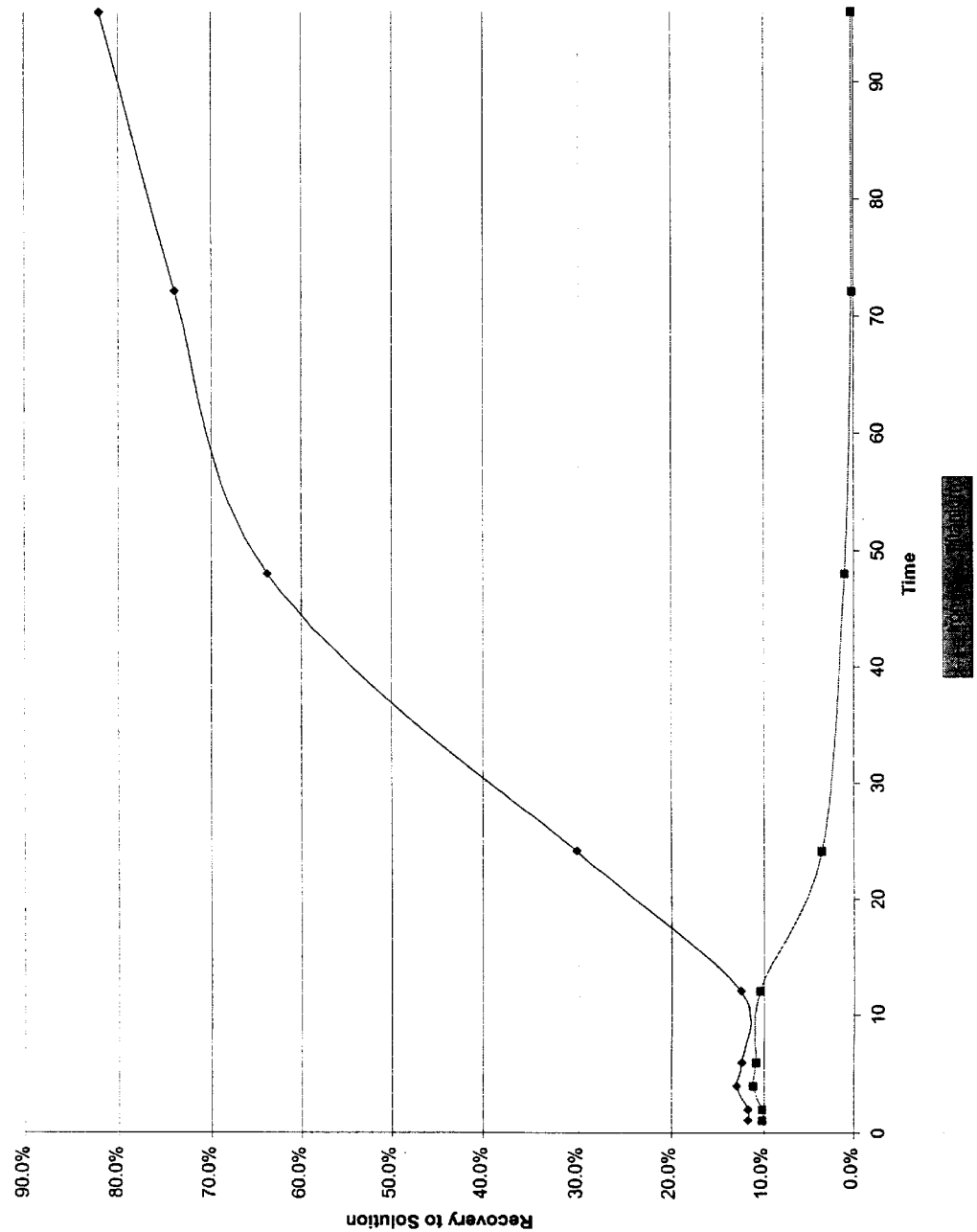
FIG. 1 shows the kinetics of leaching titanium and iron from ilmenite.

The subject invention provides novel materials and methods useful for the recovery of minerals from ores. An important component of the leaching processes of the subject invention is the use of an acidic solution. In one embodiment, the acid is sulfuric acid. Sulfuric acid used in the leaching procedures can be at a concentration ranging from about 20 grams per liter to about 500 grams per liter. In a preferred embodiment, the concentration of sulfuric acid ranges from about 150 grams per liter to about 250 grams per liter. Preferably, the concentration of sulfuric acid is approximately 200 grams per liter.

In addition to using sulfuric acid solutions in the leaching processes of the subject invention, particularly preferred embodiments of the subject invention utilize additional factors including, for example, the use of an alkali metal halide, grinding the ore, addition of a carbon source, and/or adjustment of the temperature at which the process is carried out.

In accordance with the subject invention, the efficiency of the leaching process can be improved by grinding the ore prior to treatment. In a preferred embodiment, the ore is ground so that it can pass through a 200 mesh sieve.

In a further embodiment, an alkali metal salt can be added to the leach solution to improve recovery. The alkali metal salt can be for example, an alkali metal halide, alkali metal nitrite, alkali metal nitrate, alkali metal sulfite or alkali metal thionite. The metal halide can be, for example, NaCl, KCl, NaBr or KBr, or mixtures of one or more of these. The metal sulfites can be, for example, sodium sulfite, sodium metabisulfite, sodium bisulfite, sodium dithionite, or other alkali metal or ammonium sulfite, metabisulfite, bisulfite or dithionite. The ordinarily skilled artisan, having the benefit of the teachings disclosed herein, can readily determine those alkali metal salts that can be used in conjunction with the particular acid solution used in the solubilization step of the process.

A further embodiment of the subject invention involves the use of a carbon source to improve recovery. The carbon source can be, for example, graphite or activated carbon. The source of this material can be, for example, from coconut shell or wood.

The present invention accordingly provides in one embodiment a method for recovering titanium oxide(s) from a titanium and iron-containing mineral feed, the method including the steps of:

(a) solubilizing titanium and iron by leaching the feed with an acidic solution in the presence of an alkali metal halide;

(b) selectively precipitating titanium oxide(s), and (c) recovering titanium oxide(s).

Typically, the titanium oxide(s) may be titanium dioxide.

The titanium-containing mineral feed is typically post heavy mineral concentration products. The feed will include titanium mineralization. Typical examples of this titanium mineralization are ilmenite ($FeTiO_3$), leucoxene, perovskite ($CaTiO_3$) and titano magnetite.

The feed may in an alternative embodiment comprise a bulk ilmenite concentrate. Other titanium-containing mineral feed materials are contemplated within the scope of the invention.

The present invention provides in another separate embodiment a method for recovering synthetic rutile ($TiO_2$), from a mineral feed comprising ilmenite ($FeTiO_3$), the method including the steps of:

(a) solubilizing titanium and iron by leaching the ilmenite with an acidic solution in the presence of an alkali metal halide;

(b) selectively precipitating titanium oxide(s), and (c) recovering titanium oxide as $TiO_2$.

In step (a) of the method, the acidic solution preferably includes sulfuric acid. The sulfuric acid used in the leaching step is typically at a concentration in the range of from about 20 grams per liter to about 500 grams per liter. In a preferred embodiment, the concentration of sulfuric acid is in the range of from about 150 grams per liter to about 250 grams per liter. Most preferably the concentration of sulfuric acid is about 200 grams per liter. Other acids contemplated for use in step (a) of the present invention include, but are not limited to, a halide acid such as hydrochloric acid or hydrobromic acid. The typical concentration of halide acid used is in the range of from about 150 to about 350 grams.per liter.

Step (a) is typically carried out in the presence of an alkali metal halide at a ratio of alkali metal halide to ilmenite in the feed in the range of from about 1:1 to 2:1. Preferably, the ratio of alkali metal halide is from about 1:1 to 1.5:1. More preferably, the ratio is about 1.2:1. Suitable alkali metal halides include, but are not limited to, NaCl, KCl or KBr or mixtures of one or more of these.

In the methods of the present invention, the alkali metal halide can be added directly to the leach solution. Alternatively, the alkali metal halide can be combined with the feed prior to introduction of the leaching solution. In this case, the feed may be subjected to a boildown pretreatment (i.e., by boiling down to approximate dryness) in the presence of the alkali metal halide whereby the feed (e.g., ilmenite surfaces) are coated with alkali metal halide prior to leaching. Optionally, a combination of the foregoing, i.e., direct addition of alkali metal halide to the feed and combination of alkali metal halide with the feed prior to leaching, can be used in the subject methods. Thus, for example, a proportion of the alkali metal halide is combined with the feed prior to step (a) and a proportion of the alkali metal halide is added directly to the leach solution. Typically, steps (a) and (b) may be conducted simultaneously or separately once solubilization commences. It is particularly preferred to concurrently remove some of the pregnant solution from the leach residue to permit precipitation to take place away from the leach residue. In this way, the precipitate may be restricted from coating the leach residue which could potentially decrease the efficiency of the process.

In one embodiment, the precipitation step (b) can be regulated by adjustment of temperature and/or pH of the solution. Typically, step (a) is carried out at a temperature in the range of from about 80° C. to about 120° C. and, preferably, is in the range of from about 90° C. to about 110° C. In a preferred embodiment, the operating temperature for step (a) is about 100° C.

In one embodiment, the leach solution in step (a) has a solids content of up to about 60% by weight. Preferably, the leach solution has a solids content of from about 10% to about 40%.

To facilitate more rapid leaching, the feed may be ground into finer particles. In a preferred embodiment, the feed may be subjected to fine grinding. Preferably, the majority of particles in the feed are capable of passing through a 75 micron sieve after grinding.

Optionally, a source of carbon may be provided in the subject method. The carbon may be in the form of any commercially available carbon source including, for example, activated carbon, coal, coke, charcoal or graphite. A preferred source of carbon is activated carbon derived from coconut shell. The ratio of carbon to feed (e.g. ilmenite) is typically between about 0.01:1 to 1:1.

Methods according to the present invention may be carried out at or above atmospheric pressure. When elevated pressures are used, the typical elevated pressures and temperatures at which the present methods may be performed are in the range of from about 1 bar to about 30 bar. Preferably, pressures are in the range of from about 1 bar to about 5 bar. Temperatures used in the subject methods range from about 100° C. to about 235° C. Preferably temperatures range from about 100° C. to about 150° C.

The leach residue produced from step (a) can be subjected to further leaching to solubilize undissolved iron and/or titanium in the residue. The further leaching can be performed using fresh acidic solution. In an alternative embodiment, spent leach liquor or a combination of fresh acidic solution and spent leach liquor, can be used.

In another embodiment, step (a) of the subject method can be performed in the presence of ferrous and/or ferric ions to promote dissolution of the iron mineralization. Ferrous ions will generally be present in recirculated process plant solutions.

If desired, iron may be removed from the leachant solution using standard techniques, such as precipitation. The purpose is to remove soluble iron from any process solutions. Solvent extraction, ion exchange, reverse osmosis or other techniques can also be used to remove soluble iron.

The leach time for this embodiment is generally relatively long, and typically is in the range of from about 50 to about 120 hours. Preferably, leach time is from about 60 to about 100 hours. However, the operating conditions are much milder than conventional autoclave techniques, leading to large capital and operating cost advantages. Sulfuric acid and alkali metal halides are easier to handle than the hydrochloric acid used in the Zoumei Jin et al. process referred to above.

The present invention provides in another separate embodiment, a method for recovering titanium from a titanium and iron-containing mineral feed, the method including the steps of:
(a) solubilizing titanium and iron by leaching the feed with an acidic solution in the presence of an alkali metal halide and a source of activated carbon;
(b) selectively precipitating titanium oxide(s), and
(c) recovering titanium oxide(s) from the leach residue.

The present invention provides in another separate embodiment a method for recovering titanium from a mineral feed comprising ilmenite ($FeTiO_3$), the method including the steps of:
(a) solubilizing titanium and iron in the ilmenite by leaching the ilmenite with an acidic solution in the presence of an alkali metal halide and a source of activated carbon;
(b) selectively precipitating titanium oxide(s), and
(c) recovering titanium oxide from the leach residue as $TiO_2$.

The present invention provides in another separate embodiment a method for recovering titanium oxide(s) from a mineral feed comprising ilmenite ($FeTiO_3$), the method including the steps of:
(a) leaching the ilmenite with an acidic solution at a temperature in the range of from about 80 to 120° C. in the presence of an alkali metal halide for a predetermined time, the leach solution containing up to about 60% by weight solids to produce a leachant solution containing iron and titanium ions;
(b) separating the iron from the titanium in the leachant solution; and
(c) recovering the separated titanium as $TiO_2$.

As mentioned above, maintaining the titanium in solution rather than allowing it to report to the residue as a precipitate has been observed to further enhance the likelihood of the titanium being recovered as a pure product. Where most of the titanium reports to the residue, other materials that may be found in proximity with the ilmenite mineral including chromite, lime, magnesia, silica or silicates, manganese, alumina, vanadium, phosphate and zirconium will also tend to remain in the residue along with undissolved iron. The presence of such materials is likely to dilute the purity of titanium recoverable from the residue.

Depending on the metals content of the leach solution, a typical reaction time for step (a) of this embodiment is up to about an hour. Preferably, the reaction time of step (a) is up to about half an hour. More preferably, the reaction time is in the range of from about 5 to about 15 minutes. It has been observed that titanium solubility reaches a peak during reaction times of approximately that length.

Optionally, step (a) above may be repeated to solubilize unleached titanium in the residue obtained following step (a) in order to obtain cumulative maximum solubility of titanium. Fresh acidic solution and alkali metal halide can be used when step (a) is repeated. Step (a) may in one embodiment comprise a type of countercurrent leach circuit.

The acidic solution in this embodiment can be supplemented with hydrochloric acid in one or more steps of a repeated leach sequence to assist in enhancing the titanium solubility profile.

In another separate embodiment the present invention provides a method for recovering titanium from a titanium and iron-containing mineral feed, the method including the steps of:
(a) contacting the feed material with an halide acid solution or an acid—alkali halide solution for a period of time sufficient to solubilize the titanium but insufficient to allow the titanium to appreciably precipitate;
(b) selectively precipitating titanium oxide(s); and
(c) recovering titanium oxide(s).

The halide acid used in step (a) can be, for example, hydrochloric acid or hydrobromic acid. The concentration of halide acid used can be in the range of from about 150 to about 350 grams per liter acid.

Any precipitated titanium reporting to the leach residue of this embodiment may be recovered in subsequent leaching operations.

The present invention provides in another separate embodiment a method for recovering titanium from a feed comprising finely ground ilmenite ($FeTiO_3$), the method including the steps of:
(a) leaching the ilmenite with an acidic solution containing sulfuric acid at a temperature of about 100° C. in the presence of an alkali metal halide selected from the group consisting of NaCl, KCl and KBr and in the presence of a source of activated carbon for up to about half an hour to produce a leachant solution containing iron and titanium ions, the ratio of alkali metal halide to ilmenite in the feed being about 1.2:1; and the ratio of activated carbon to ilmenite in the feed being about 0.01:1, the solids: content of the leach solution being up to about 60% by weight;

(b) repeating step (a);
(c) separating at least some of the pregnant solution from the leach residue;
(d) selectively precipitating the titanium oxide(s) from the pregnant solution; and
(e) recovering the titanium oxide as $TiO_2$.

In a particularly preferred embodiment, the present invention provides multistage leaching of iron and titanium from an iron and titanium-bearing mineral feed, the method comprising the following steps:
(a) contacting the feed material with an acid—alkali halide solution for a period of time sufficient to solubilize the titanium but not so long as to allow the titanium to appreciably precipitate;
(b) separating the pulp from the leach liquor;
(c) contacting the pulp with fresh leach liquor and repeating steps (a) and (b) until all economically feasible titanium is leached; and
(d) selectively recovering the titanium and iron in separate stages from the leach solutions by precipitation, solvent extraction or other means.

The conditions of step (a) can involve percent solids on a weight/weight basis of between about 1 percent and about 60 percent. The typical percent solids are in the range of from about 10% to 40%. The solids may be ground to fine size to facilitate leaching, typically so that the feed passes a 73 micron sieve. The acid used is most typically sulfuric acid. The acid concentration can range from about 20 to about 300 grams per liter acid. Most typically the acid concentration ranges from about 150 to 230 gram per liter.

The alkali halide can be any alkali halide. Preferably, the alkali halide is NaCl, KCl, NaBr, or KBr. The concentration of alkali halide can range from about 50 grams per liter to about 400 grams per liter. Preferably, the alkali halide concentration is about 100 to about 200 grams per liter.

The leaching is most typically carried out at about room pressure. The temperature can be between about 40° C. and about 110° C. at room pressure. Preferably, leaching temperature is between about 90° C. and about 105° C. Leaching at room pressure will typically be performed in a leach vessel with a condenser to limit the loss of halide acid generated in the leach solution. The titanium is allowed to reach a concentration as high as possible before it begins to re-precipitate onto the leach feed material. This is typically slightly over four (4) grams of titanium per liter of solution. The leach time to accomplish this solubilization will depend on the various aforementioned parameters but will usually range from about 10 minutes to 1 hour.

The method of solid—liquid separation in step (b) can be any method that makes a good separation of the solids from the leach liquor in a relatively short time. These include methods such as cyclones, filters, centrifuges, magnetic separators, and settlers. The list is not meant to exclude any unnamed method.

The fresh leach liquor in step (c) can be leach liquor from which the titanium content has been reduced or eliminated. The iron content of liquor should be controlled so that no precipitation of an iron compound occurs during the leaching.

The titanium can be totally or partially removed from the leach liquor in step (d) by the method that makes the most economic sense for any given plant. The methodology available includes, but is not limited to, precipitation by seeding or pH adjustment, crystallization, solvent extraction, and ion exchange.

The iron can be removed in a similar fashion in a step before or after the titanium recovery. Titanium and iron are recovered as separate products, in separate stages. The titanium would be recovered as a titanium salt, most typically $TiO_2$. The iron would most typically be recovered as an iron salt such as ferrous chloride or sulphate.

In addition to titanium and iron leaching, the present invention also concerns methods for the recovery of other minerals, such as nickel, cobalt, copper, molybdenum, lead, zinc, gold or silver from ore, soil, concentrate, slag or residue. In one embodiment, a method is provided for the dissolution of nickel and cobalt from a nickel, cobalt and iron-containing mineral feed, the method comprising solubilizing the nickel, cobalt and iron in the fired by leaching the feed with an acidic solution. In a further embodiment, an alkali metal salt can be added to the leach solution to improve recovery. The alkali metal salt can be for example, an alkali metal halide, alkali metal nitrite, alkali metal nitrate, alkali metal sulfite or alkali metal thionite. The metal halide can be, for example, NaCl, KCl, NaBr or KBr, or mixtures of one or more of these. The metal sulfites can be, for example, sodium sulfite, sodium metabisulfite, sodium bisulfite, sodium dithionite, or other alkali metal or ammonium sulfite, metabisulfite, bisulfite or dithionite. The ordinarily skilled artisan, having the benefit of the teachings disclosed herein, can readily determine those alkali metal salts that can be used in conjunction with the particular acid solution used in the solubilization step of the process. In another embodiment, the method of the invention can be conducted at above ambient temperatures and at or above atmospheric pressures prior to metal extraction by precipitation, solvent extraction or other means.

Where the metals of interest are nickel and cobalt, the nickel and cobalt-containing mineral feed is typically post beneficiation by comminution and thickening products. A typical example of nickel and cobalt mineralization is a laterite ore. Alternatively, the feed may comprise a bulk laterite concentrate.

One embodiment of the present method provides for recovering nickel and cobalt from a mineral feed comprising laterite, the method including the step of solubilizing nickel and cobalt and iron in the laterite by leaching the laterite with an acidic solution in the presence of an alkali metal halide at a temperature not exceeding about 150° C. at normal pressures prior to nickel and cobalt extraction by established precipitation, solvent extraction or other means.

Preferably, the acidic solution contains sulfuric acid. The sulfuric acid used in the leaching step is typically at a concentration in the range of from about 20 grams per liter to about 500 grams per liter. In a preferred embodiment, the concentration of sulfuric acid is in the range of from about 150 grams per liter to about 250 grams per liter. Preferably, the concentration of sulfuric acid is about 200 grams per liter. Other acids contemplated for use in the present invention include halide acids, for example, hydrochloric acid or hydrobromic acid. The typical concentration of halide acid used is in the range from about 50 to about 350 grams per liter acid.

The process is typically carried out in the presence of an alkali metal halide at a ratio of alkali metal halide to laterite in the feed in the range of from about 0.05:1 to about 4:1. Preferably, the ratio is about 0.1:1, and most preferably about 0.2:1.

In any of the described embodiments of the invention, including those methods directed towards leaching of titanium and non-titanium transition elements from a mineral feed, the alkali metal salt may be added directly to the leach solution. Alternatively, the alkali metal salt is combined with the feed prior to introduction of the leaching solution. In this case, the feed may be subjected to a boildown pre-treatment (i.e., by boiling down to approximate dryness) in the presence of the alkali metal salt whereby the feed (e.g., laterite) surfaces are coated with alkali metal salt prior to leaching. In another alternative embodiment the solution of alkali salt may be sprayed on a heap of lateritic ore and allowed to evaporate. Further a combination of the foregoing may be adopted. Namely, a proportion of the alkali metal salt is combined with the feed prior to solubilization and a proportion of the alkali metal salt is added directly to the leach solution. It is particularly preferred to concurrently remove some of the pregnant solution from the leach residue to permit separation of the nickel and cobalt to take place away from the leach residue.

Typically, the process is carried out at a temperature in the range of from about 80° C. to about 120° C. Preferably, the temperature is in the range of from about 90° C. to about 110° C. A typical operating temperature for the process is about 100° C.

The leach solution in the subject process preferably has a solids content of up to about 60% by weight. Preferably, the leach solution has a solids content of from about 10 to 40%.

To facilitate rapid leaching, the feed can be ground into smaller particles. It is preferred that the feed be subjected to fine grinding. Preferably, the majority of particles in the feed are capable of passing through 75 micron sieve. Typically, at least 75% of the particles in the feed are of a size that can pass through 75 micron sieve openings.

Methods according to the present invention may be carried out at or above atmospheric pressure. When elevated pressures are used, the typical elevated pressures and temperatures at which methods according to the invention may be performed are in the range of from about 1 bar to about 30 bar. Preferably, pressures are in the range of from about 1 bar to about 5 bar and temperatures range from about 100° C. to about 235° C. Preferably in the range of from about 100° C. to about 150° C. The methods described in the embodiments of the present invention do not conflict with known autoclave technology as the present invention involves the use of alkali metal halides in combination with sulfuric acid whereas known autoclave technology utilizes pure acid or ammoniacal solutions to leach the nickel and cobalt from lateritic feed ores.

The leach residue produced by the present process may be subjected to further leaching to solubilize undissolved iron and/or nickel and cobalt in the residue. The further leaching can be performed using fresh acidic solution. In an alternative embodiment, spent leach liquor, or a combination of fresh acidic solution and spent leach liquor, may be used in the process.

Additionally, the process may be performed in the presence of ferrous and/or ferric ions to promote dissolution of the iron mineralization. Ferrous ions will generally be present in recirculated process plant solutions.

Depending on the metals content of the leach solution, a typical reaction time for the process of this embodiment is up to about six hours. Preferably, the reaction time is up to about two hours. More preferably, the reaction time is in the range of from about 15 minutes to about 3 hours. It has been observed that nickel and cobalt solubility reaches a peak during reaction times of approximately that length. A person of ordinary skill in the art can vary leach time so as to leach less of an unwanted species such as manganese or iron at the expense of some cobalt and nickel recovery.

The process above may be repeated to solubilize unleached nickel or cobalt in the residue in order to obtain cumulative maximum solubility of nickel and cobalt. Fresh acidic solution and alkali metal halide may be used when the process is repeated. The process may in one embodiment comprise a type of countercurrent leach circuit.

The acidic solution may in this embodiment be supplemented with hydrochloric acid in one or more steps of a repeated leach sequence to assist in enhancing the nickel or cobalt solubility profile.

In another embodiment of the present invention, a metal halide salt may be used either to precondition an aqueous slurry or it may be sprayed onto the feed material and allowed to evaporate prior to contacting with sulfuric acid.

Upon contact with sulfuric acid the resultant slurry is permitted to leach for a short time (typically less than about fifteen minutes) but most preferably about five minutes or less. The liquid is then separated and sent for cobalt recovery. This flash leaching process utilizes the selective nature of the leach to achieve a cobalt rich solution containing only minor amounts of nickel, manganese, iron, etc.

The residue from the flash leach is subsequently leached with the metal halide sulfuric acid mixture for longer periods of time to solubilize the nickel and any remaining cobalt.

In another embodiment super alloy scrap and other recycled metal alloys may be leached by treating with a halide salt of the metal and sulfuric acid. The concentrations of the metal halide salt and the sulfuric acid will be dependent upon the specific scrap mixture. This embodiment can be utilized to selectively leach specific metals or to place all the metals into solution. This embodiment may also be used to solubilize radio-nucleosides of such metal as nickel from a radiated scrap. Oxygen or other oxidizing gasses such as chlorine can be added to the system to oxidize the metal.

For some oxide ores containing minerals that contain multivalent transition metals such as Co and Mn in an high oxidation state species, the alkali metal halide may be substituted with a sulfur-based reducing chemical. For example, sodium sulfite, sodium metabisulfite, sodium bisulfite, sodium dithionite, or other alkali metal or ammonium sulfite, metabisulfite, bisulfite or dithionite can be used in place of the alkali metal halide. These sulfur based reducing chemicals will facilitate the reduction of the transition metal, opening the ore up to attack by the sulfuric acid. The metal of economic interest need not always be the one reduced. Alkali metal nitrates or nitrites may be used with sulfuric acid to leach most metals. These techniques may be used to leach metals from sulfide minerals or from scrap, residue, slags, concentrates, or soils.

In another embodiment the process utilizing a metal halide salt and sulfuric acid may be used, with minor modifications, in currently existing counter current decantation (CCD) circuits. Such an embodiment would utilize fresh feed material to achieve neutralization to a pH adequate to retain iron in solution. After a liquid-solid separation has been effected, the resultant leach liquor may be further neutralized to precipitate iron as a hydroxide in the presence of a binding material. The iron precipitate may then be partially dried and pelletised to produce pig iron feed stocks.

The method of solid-liquid separation can be any method that produces a good separation of the solids from the leach liquor in a relatively short time. These include, but are not limited to, methods such as cyclones, filters, centrifuges, magnetic separators, and settlers.

The nickel or cobalt can be totally or partially removed from the leach liquor by the method that makes the most economic sense for any given plant. The methodology available includes, but is not limited to, precipitation by seeding or pH adjustment, crystallization, solvent extraction, and ion exchange.

The subject invention also concerns methods for recovering multiple metal or metal oxides in separate solutions. Mineral species of economic value are often associated with species that consume the chemical reagents that are used to leach them. Sometimes even though the consuming species is of economic value, the overall leach becomes uneconomic. The most common example of this is copper-gold ores.

Following are examples which illustrate procedures for practicing the invention. These examples should not be construed as limiting. All percentages are by weight and all solvent mixture proportions are by volume unless otherwise noted.

EXAMPLE 1
Leaching of Titanium and Iron from Ilmenite

Kinetics experiments on the leaching of titanium and iron from ilmenite shows that both are leached early on and that the titanium then precipitates and slows the iron leaching. An experiment with 100 grams of ilmenite, ground to −200 mesh was conducted. The tests were conducted with 1000 grams 200 gram per liter (g/l) sulfuric acid with 120 g/l NaCl solution. 100 grams activated carbon were added and the solution heated to 100° C. The Fe and Ti concentrations were monitored during the course of the 96 hour leach. The results are presented in FIG. 1. The results present a mechanism of initial Ti leaching into the liquor with subsequent hydroxylation and subsequent precipitation. While this occurs it slows leaching of the iron. The Ti appears to be leached within one hour.

In a separate but analogous experiment a 100 gram quantity of ilmenite with a head assay of 34.0% Fe and 27.0% Ti, and particle size such that 100% of the particles pass through a 75 micron screen, was leached for 72 hours at 100° C. in 1 liter of 200 gram per liter $H_2SO_4$–120 gram per liter alkali metal halide solution. A 100 gram quantity of activated carbon was also present in the leach solution. The leach liquor was monitored periodically for Ti and Fe content. The results of the experiment are shown in Table 1. Titanium is dissolved then observed to subsequently precipitate. The final assay of the 57.4 gram residue showed that it contained only 0.67% Fe and 46.6% Ti. Thus, 98.9% of the iron had been extracted into the solution while 99.7% of the titanium remained in the residue. The experiment indicates that due to, the initial solubilization of Ti, both Ti and Fe can ideally be extracted from ilmenite by repeated short duration leaches.

EXAMPLE 2
Consecutive One-Hour Leaching of Titanium and Iron from Ilmenite

Figure 2:
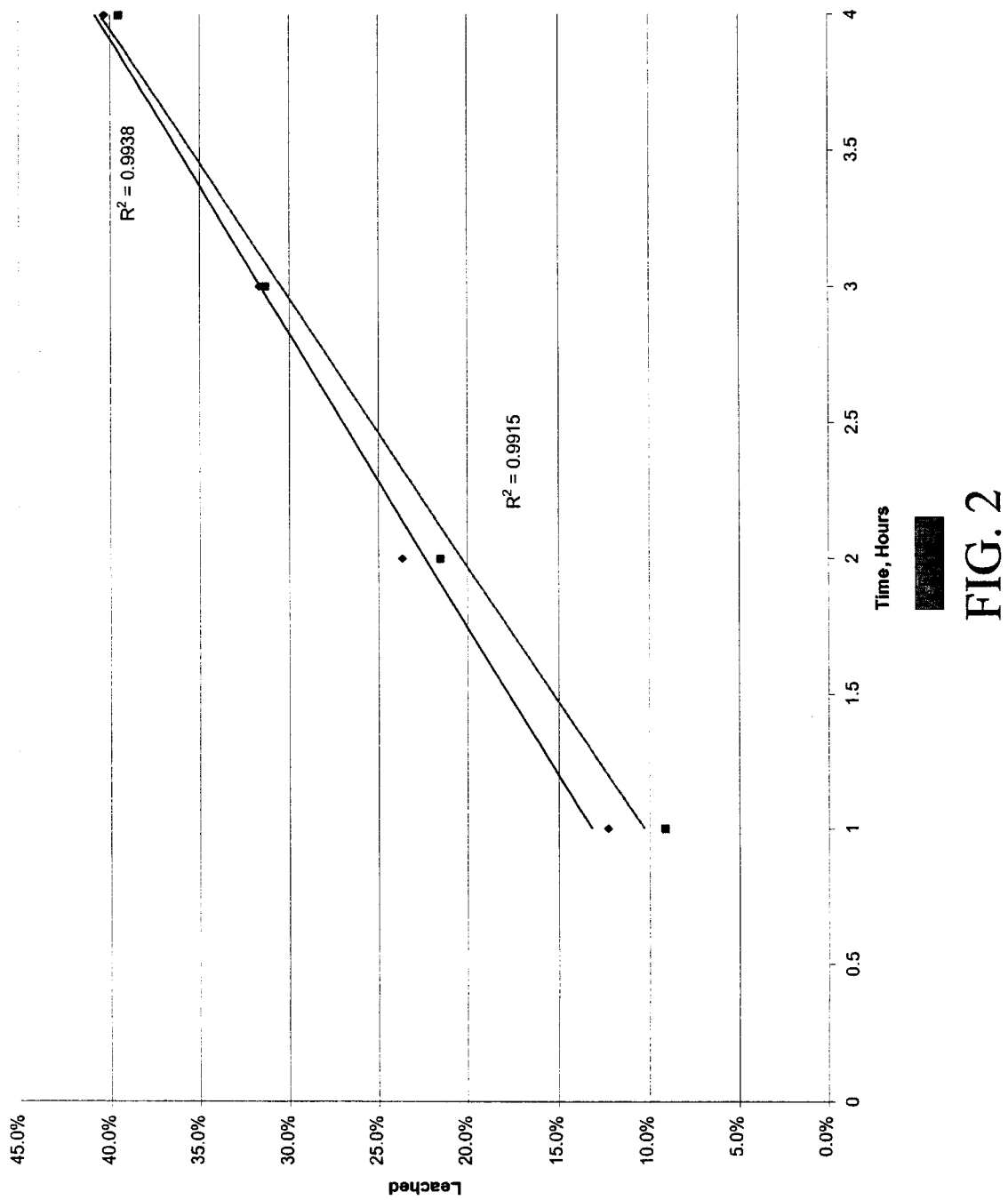
FIG. 2 shows the results of four consecutive one-hour leaches of titanium and iron from ilmenite.

Using the data in Example 1 allowed the development of a new leach procedure for ilmenite. The procedure comprises leaching ilmenite for one hour or less and then contacting it with fresh leach solution. In this manner both the iron and titanium is leached together. This was tested using the same conditions as in the 96-hour test. The results of four (4) consecutive one-hour leaches on the same ore sample are shown in FIG. 2. As can be seen, approximately the same amount of iron and ilmenite was leached in each step. The ordinarily skilled artisan, having the benefit of the teachings described herein, can determine the proper reagent concentration, temperature, particle size of the ore, whether to include carbon and its form (e.g., activated carbon or graphite), or atmospheric pressure (typically <3 atmospheres) that is optimum for a particular ore. The technique of separating the Ti as $TiO_2$ with short leach times followed by precipitation of $TiO_2$ is also applicable to other leach systems such as the hydrochloric acid leach system.

The following two experiments further demonstrate methodology for leaching both the titanium and iron from ilmenite in a multistage fashion:

Experiment A comprises a leach solution of 60 grams alkali metal halide, 100 grams $H_2$, $SO_4$, and 350 grams of $H_2O$ heated to 100° C. in Erlenmeyer flasks on a stirring hotplate to which is added 50 grams of minus 75 microns particle size ilmenite resulting in a 9% pulp density.

Experiment B comprises a leach solution of 60 grams alkali metal halide, 100 grams $H_2SO_4$, and 350 grams of $H_2O$ heated to 100° C. in Erlenmeyer flasks on a stirring hotplate to which is added 100 grams of minus 75 microns particle size ilmenite resulting in a 16% pulp density.

The ilmenite had an assay head of 30% titanium and 34% iron.

The following procedure steps are applied separately to Experiment A and Experiment B:

Step 1. A condenser is placed on the Erlenmeyer, containing the slurry comprising the prescribed solution and ilmenite feed;

Step 2. The slurry is stirred vigorously with a magnetic stirrer for 30 minutes with the temperature maintained at 100° C.;

Step 3. The Erlenmeyer and contents are cooled for a couple of minutes in a room temperature water bath;

Step 4. The Erlenmeyer solution is decanted into a centrifuge rube and centrifuged at 4,000 rpm for 5 minutes;

TABLE 1

Concentration of Titanium in Residue by Dissolution of Iron from Ilmenite

| Time | mg/l | | | Fe | | Ti | |
|---|---|---|---|---|---|---|---|
| Hours | Fe | Ti | Volume liters | gm | Cumulative Extraction | gm | Cumulative Extraction |
| 1 | 5600 | 3720 | 0.720 | 4.03 | 11.9 | 268 | 9.9 |
| 2 | 5650 | 3700 | 0.720 | 4.07 | 12.3 | 266 | 10.0 |
| 4 | 5950 | 3810 | 0.720 | 4.28 | 13.1 | 274 | 10.6 |
| 6 | 6010 | 3880 | 0.720 | 4.33 | 13.4 | 279 | 10.9 |
| 12 | 6220 | 3830 | 0.720 | 4.48 | 14.0 | 276 | 10.9 |
| 24 | 16900 | 1410 | 0.720 | 12.17 | 37.1 | 1.02 | 4.5 |
| 48 | 35000 | 212 | 0.720 | 25.20 | 76.5 | 0.15 | 1.3 |
| 72 | 38200 | 121 | 0.720 | 27.50 | 84.4 | 0.09 | 1.1 |
| 96 | 37600 | 90 | 0.720 | 27.07 | 98.9 | 0.06 | 1.0 |
| Wash 1 | 5000 | 20 | 1.000 | 5.00 | 14.7 | 0.02 | 0.1 |
| Wash 2 | 375 | 1 | 0.990 | 0.37 | 1.1 | 0.00 | 0.0 |

Step 5. The liquor in the centrifuge tube is decanted and separated from the solids into a sample bottle, volume and weight determined and retained for further test work including analysis;

Step 6. The remaining solids in the centrifuge tube are weighed and then washed, with 510 grams of fresh leach solution, back into the residue remaining in the Erlenmeyer after Step 4;

Step 7. The reconstituted slurry is stirred and the slurry temperature increased to 100° C.;

Step 8. The procedure is continued by repeating Steps 1 through 7 inclusive, a total of seven times and thus equating to a total leach duration of 4 hours;

Step 9. The post centrifuging liquors collected at each repetition of Step 5 are individually subsampled and analysed for titanium and iron;

Step 10. Calculations are conducted to determine titanium and iron contents of both solids and liquors and comparisons made with the respective elemental assay values of the ilmenite ore feed;

Step 11. The individual liquors remaining after the subsampling conducted in Step 9 are combined in a flask and subsampled and analysed for titanium and iron;

Step 12. The titanium can be totally or partially removed from the leach liquor by the method that makes the most economic sense for any given plant. The methodologies available include, but are not limited to, precipitation by seeding or pH adjustment, crystallization, solvent extraction, and ion exchange.

Figure 3:
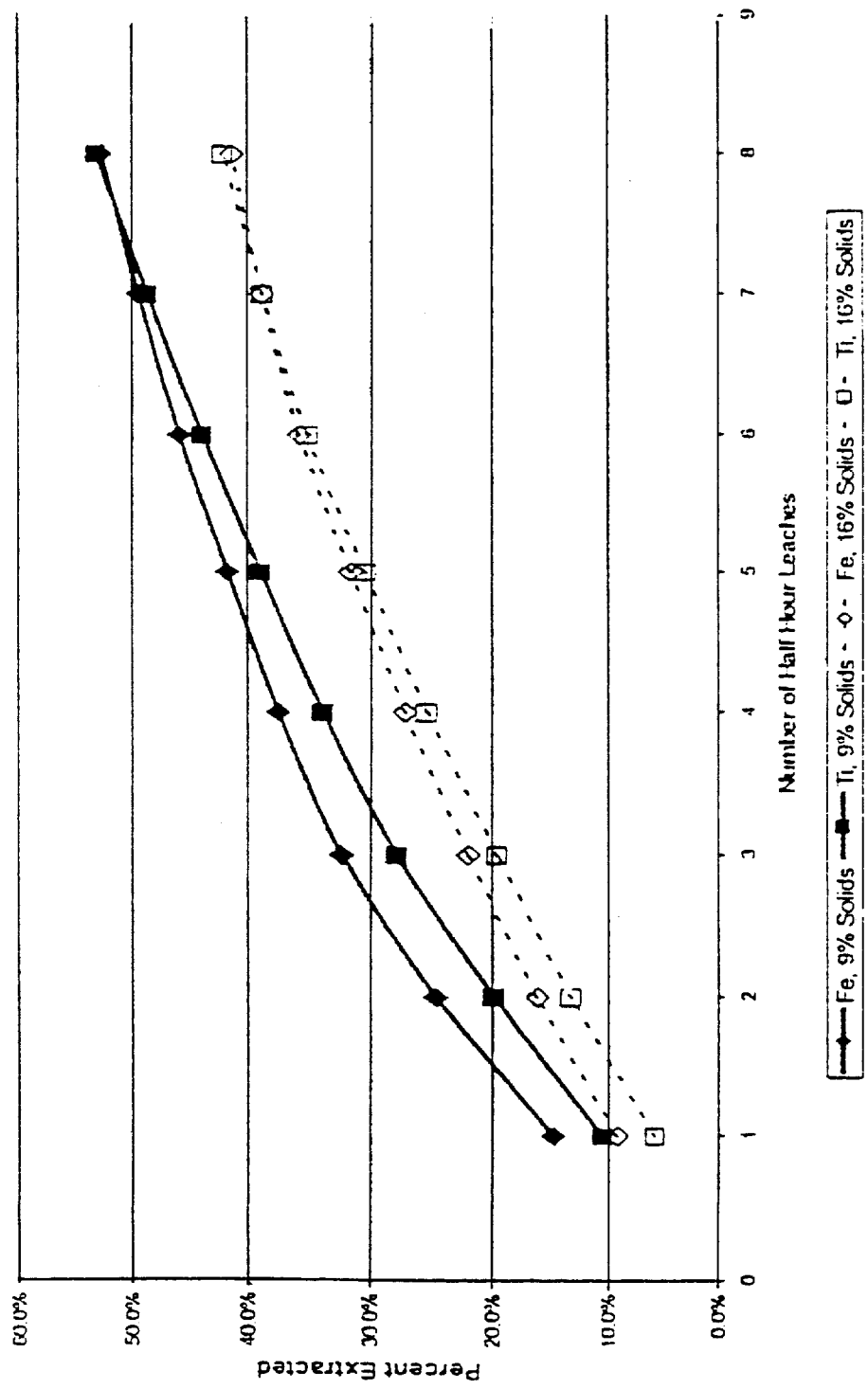
FIG. 3 shows pulp density relationships in the leaching of titanium and iron from ilmenite.

The results of the experiments are shown in Table 2 and FIG. 3. For both levels of percent solids the trend is for roughly a constant amount of titanium to be extracted at each step.

TABLE 2

Pulp Density Relationships on the Leaching of Titanium and Iron from Ilmenite

| Leach | Time Hours | g/l Fe | g/l Ti | Volume Liters | Fe gm | Fe Cumulative Extrcation | Ti gm | Ti Cumulative Extraction |
|---|---|---|---|---|---|---|---|---|
| | | | | 9% Solids on a weight/weight basis | | | | |
| 1 | 0.5 | 6.32 | 3.96 | 0.400 | 2.53 | 14.8% | 1.58 | 10.6 |
| 2 | 0.5 | 3.97 | 3.32 | 0.423 | 1.68 | 24.7 | 1.40 | 19.9 |
| 3 | 0.5 | 3.14 | 2.88 | 0.412 | 1.29 | 32.3 | 1.19 | 27.8 |
| 4 | 0.5 | 2.15 | 2.18 | 0.410 | 0.88 | 37.4 | 0.89 | 33.8 |
| 5 | 0.5 | 1.77 | 1.85 | 0.415 | 0.73 | 41.7 | 0.77 | 38.9 |
| 6 | 0.5 | 1.71 | 1.81 | 0.412 | 0.70 | 45.9 | 0.75 | 43.9 |
| 7 | 0.5 | 1.50 | 1.75 | 0.412 | 0.62 | 49.5 | 0.72 | 48.7 |
| 8 | 0.5 | 1.34 | 1.61 | 0.417 | 0.56 | 52.8 | 0.67 | 53.2 |
| 9 | 0.5 | 1.44 | 1.69 | 0.410 | 0.59 | 56.2 | 0.69 | 57.8 |
| 10 | 0.5 | 1.06 | 1.28 | 0.415 | 0.44 | 58.8 | 0.53 | 61.3 |
| 11 | 0.5 | 0.90 | 1.18 | 0.409 | 0.37 | 61.0 | 0.48 | 64.5 |
| Wash 1 | | 0.00 | 0.00 | 0.390 | 0.00 | 61.0 | 0.00 | 64.6 |
| 12 | 0.5 | 1.03 | 1.040 | 0.403 | 0.42 | 63.4 | 0.42 | 67.3 |
| 13 | 0.5 | 0.91 | 0.960 | 0.415 | 0.38 | 65.6 | 0.40 | 70.0 |
| 14 | 0.5 | 0.86 | 0.93 | 0.410 | 0.35 | 67.7 | 0.38 | 72.5 |
| 15 | 0.5 | 0.85 | 0.89 | 0.412 | 0.35 | 69.8 | 0.37 | 75.0 |
| 16 | 0.5 | 0.77 | 0.75 | 0.420 | 0.32 | 71.7 | 0.32 | 77.1 |
| 17 | 0.5 | 0.63 | 0.64 | 0.415 | 0.26 | 73.2 | 0.27 | 78.9 |
| 18 | 0.5 | 0.65 | 71.0% | 0.402 | 0.26 | 74.7 | 0.29 | 80.8 |
| 19 | 0.5 | 0.58 | 0.65 | 0.415 | 0.24 | 76.1 | 0.27 | 82.6 |
| 20 | 0.5 | 0.52 | 0.6 | 0.412 | 0.21 | 77.4 | 0.25 | 84.2 |
| 21 | 0.5 | 0.53 | 0.58 | 0.415 | 0.22 | 78.7 | 0.24 | 85.8 |
| 22 | 0.5 | 0.48 | 0.53 | 0.417 | 0.20 | 79.9 | 0.22 | 87.3 |
| 23 | 0.5 | 0.41 | 0.48 | 0.413 | 0.17 | 80.8 | 0.20 | 88.6 |
| Wash 2 | | 0.002 | 0.0024 | 0.540 | 0.00 | 80.9 | 0.00 | 88.6 |
| 24 | 0.5 | 0.37 | 0.43 | 0.410 | 0.15 | 81.7 | 0.18 | 89.8 |
| Wash 3 | | 0.0023 | 0.0019 | 0.590 | 0.00 | 81.7 | 0.00 | 89.8 |
| | | | | 16% Solids on a weight/weight Basis | | | | |
| | 0.25 | 7.07 | 4.00 | 0.010 | 0.07 | 0.2 | 0.04 | 0.1 |
| 1 | 0.50 | 8.16 | 4.52 | 0.380 | 3.10 | 9.3 | 1.72 | 5.9 |
| | 0.25 | 4.77 | 4.63 | 0.010 | 0.05 | 9.4 | 0.05 | 6.0 |
| 2 | 0.50 | 5.78 | 5.44 | 0.402 | 2.32 | 16.3 | 2.19 | 13.3 |
| 3 | 0.50 | 4.74 | 4.54 | 0.418 | 1.98 | 22.1 | 1.90 | 19.6 |
| 4 | 0.50 | 4.16 | 4.13 | 0.419 | 1.74 | 27.2 | 1.73 | 25.4 |
| 5 | 0.50 | 3.62 | 3.63 | 0.418 | 1.51 | 31.6 | 1.52 | 30.5 |
| 6 | 0.50 | 3.30 | 3.27 | 0.425 | 1.40 | 35.7 | 1.39 | 35.1 |
| Wash 1 | | 0.05 | 0.04 | 0.511 | 0.03 | 35.8 | 0.02 | 35.2 |
| 7 | 0.50 | 2.54 | 2.65 | 0.408 | 1.04 | 38.8 | 1.08 | 38.8 |
| 8 | 0.50 | 2.08 | 2.41 | 0.417 | 0.87 | 41.4 | 1.00 | 42.1 |
| Wash 2 | 0.50 | 0.08 | 0.09 | 0.450 | 0.04 | 41.5 | 0.04 | 42.3 |

EXAMPLE 3
Effect of Alkali Metal Halide

Figure 4:
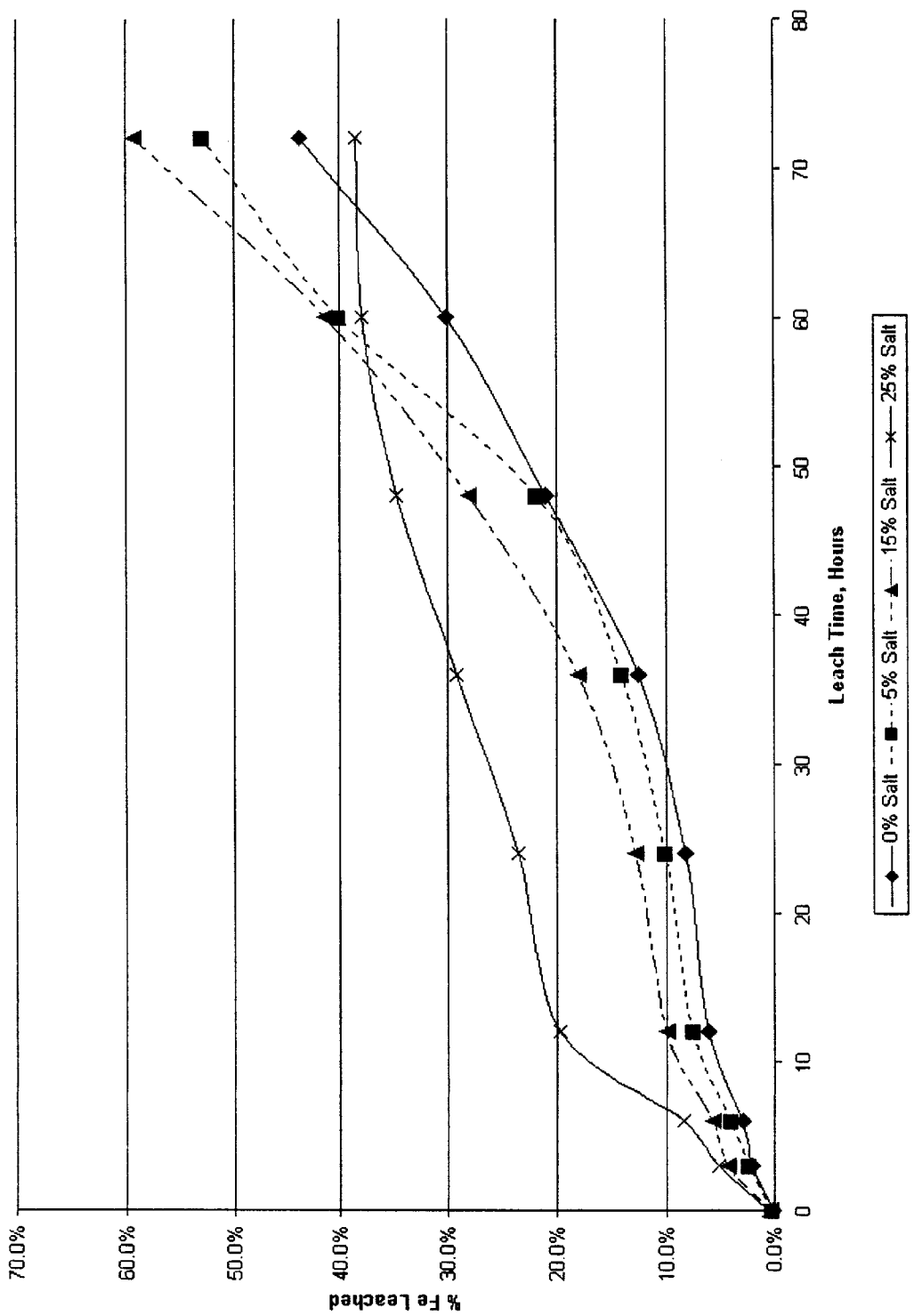
FIG. 4 shows the results of experiments evaluating the effect of an alkali metal halide (NaCl) on the sulfuric acid leaching process.

Experiments were conducted to evaluate the effect of an alkali metal halide on the recovery of iron from ore using the sulfuric acid process of the subject invention. The results are shown in FIG. 4. In this case, the salt which was used was NaCl at 0%, 5%, 15% and 25% (w/w). These tests were performed using 200 gram per liter sulfuric acid solution and no activated carbon at 100° C. on unground ore. The addition of salt speeds the reaction rate. However, at around 15 to 20% salt (150 to 200 grams per liter), NaCl appears to become counterproductive. The total percentage of iron leached actually falls after 15% NaCl is reached.

In a separate but analogous experiment to further demonstrate the effect of an alkali metal halide on the leaching of iron out of ilmenite, the samples of 100 grams of ilmenite feed were leached with 200 grams of sulfuric acid, 700 grams of water at 100° C. and varying amounts of alkali metal halide for 72 hours. The amounts of alkali metal halide were 0, 50, 150 and 250 grams representing 0, 5, 15, and 25% (w/w) alkali metal halide solutions. The leach rate of the iron was observed. The results are shown in Table 3.

TABLE 3

The effect of alkali metal halide on the sulphuric acid leaching process

| Time Hours | Fe mg/l | Volume liters | Fe Extraction gm | Cumulative |
|---|---|---|---|---|
| *No Alkali Metal Halide* | | | | |
| 0 | 86 | 0.700 | 0.06 | 0.2% |
| 3 | 990 | 0.700 | 0.69 | 2.0% |
| 6 | 1460 | 0.700 | 1.02 | 3.0% |
| 12 | 3000 | 0.700 | 2.10 | 6.2% |
| 24 | 4000 | 0.700 | 2.80 | 8.2% |
| 36 | 6100 | 0.700 | 4.27 | 12.6% |
| 48 | 10200 | 0.700 | 7.14 | 21.0% |
| 60 | 14600 | 0.700 | 10.22 | 30.1% |
| 72 | 20700 | 0.720 | 14.90 | 46.5% |
| Wash 1 | 860 | 1.020 | 0.88 | |
| Wash 2 | 28 | 0.990 | 0.03 | |
| *5% Alkali Metal Halide* | | | | |
| 0 | 100 | 0.700 | 0.07 | 0.2% |
| 3 | 1110 | 0.700 | 0.78 | 2.4% |
| 6 | 1860 | 0.700 | 1.30 | 4.0% |
| 12 | 3500 | 0.700 | 2.45 | 7.6% |
| 24 | 4700 | 0.700 | 3.29 | 10.2% |
| 36 | 6500 | 0.700 | 4.55 | 14.1% |
| 48 | 10100 | 0.700 | 7.07 | 21.8% |
| 60 | 18600 | 0.700 | 13.02 | 40.2% |
| 72 | 21700 | 0.790 | 17.14 | 56.5% |
| Wash 1 | 1100 | 1.000 | 1.10 | |
| Wash 2 | 34 | 1.000 | 0.03 | |
| *15% Alkali Metal Halide* | | | | |
| 0 | 189 | 0.700 | 0.13 | 0.4% |
| 3 | 1910 | 0.700 | 1.34 | 4.3% |
| 6 | 2500 | 0.700 | 1.75 | 5.7% |
| 12 | 4400 | 0.700 | 3.08 | 10.0% |
| 24 | 5600 | 0.700 | 3.92 | 12.8% |
| 36 | 7900 | 0.700 | 5.53 | 18.0% |
| 48 | 12300 | 0.700 | 8.61 | 28.0% |
| 60 | 18200 | 0.700 | 12.74 | 41.4% |
| 72 | 25300 | 0.720 | 18.22 | 63.9% |
| Wash 1 | 1350 | 1.020 | 1.38 | |
| Wash 2 | 61 | 0.990 | 0.06 | |
| *25% Alkali Metal Halide* | | | | |
| 0 | 250 | 0.700 | 0.18 | 0.5% |
| 3 | 2600 | 0.700 | 1.82 | 5.2% |
| 6 | 4200 | 0.700 | 2.94 | 8.4% |
| 12 | 9800 | 0.700 | 6.86 | 19.7% |

TABLE 3-continued

The effect of alkali metal halide on the sulphuric acid leaching process

| Time Hours | Fe mg/l | Volume liters | Fe Extraction gm | Cumulative |
|---|---|---|---|---|
| 24 | 11700 | 0.700 | 8.19 | 23.5% |
| 36 | 14500 | 0.700 | 10.15 | 29.1% |
| 48 | 17300 | 0.700 | 12.11 | 34.7% |
| 60 | 18900 | 0.700 | 13.23 | 37.9% |
| 72 | 18700 | 0.720 | 13.46 | 47.9% |
| Wash 1 | 2960 | 1.020 | 3.02 | |
| Wash 2 | 230 | 0.990 | 0.23 | |

EXAMPLE 4
Effect of Grinding of Ore

Figure 5:
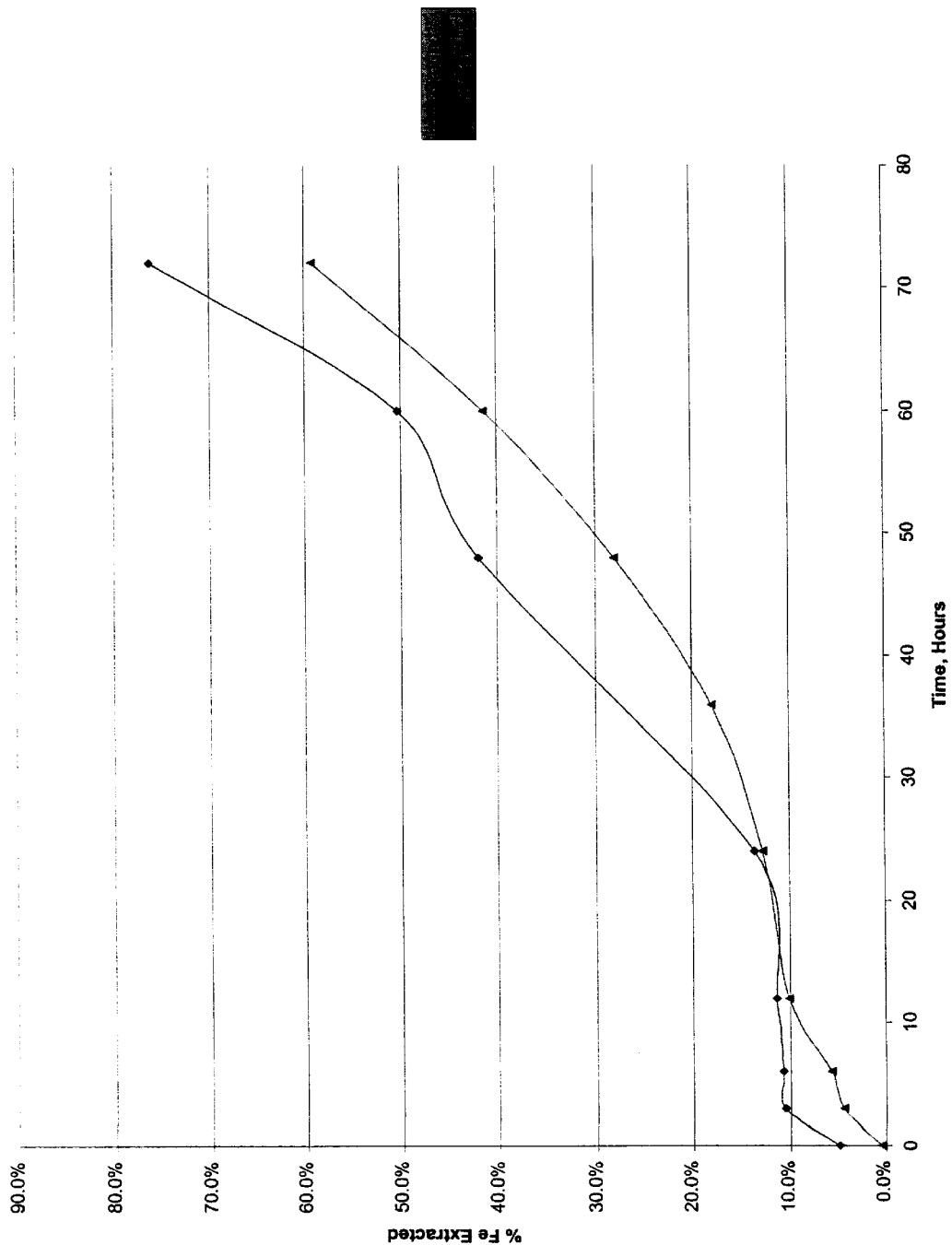
FIG. 5 shows the results of experiments evaluating the effects of grinding the ore on recovery rates.

In accordance with the subject invention, grinding of the ore can be used to increase the reaction rate of leaching iron from ilmenite. This is shown in FIG. 5 and Table 4. Both tests were performed using a 100 gram quantity of ilmenite placed in one liter of 200 grams per liter sulfuric acid and 150 grams per liter alkali metal halide solution heated to 100° C. The experiments were conducted on two samples of the same ilmenite feed. One experiment used course ilmenite (100% retained on a 75 micron screen) and the other experiment used fine ilmenite (100% passing through a 75 micron screen). The slurry was vigorously stirred for 72 hours and the iron concentration periodically monitored. The ground ore (finer particle sized samples) had faster early and late leach kinetics than the unground ore (coarser particle sized sample). The kinetics of the ore during the 5 to 25 hour time period was similar in both cases.

TABLE 4

The Results of Feed Particle Size on the Sulphuric Acid Leaching Process.

| Time Hours | Fe mg/l | Volume liters | Fe Extraction gm | Cumulative |
|---|---|---|---|---|
| *Coarse Ilmenite* | | | | |
| 0 | 189 | 0.700 | 0.13 | 0.4% |
| 3 | 1910 | 0.700 | 1.34 | 4.3% |
| 6 | 2500 | 0.700 | 1.75 | 5.7% |
| 12 | 4400 | 0.700 | 3.08 | 10.0% |
| 24 | 5600 | 0.700 | 3.92 | 12.8% |
| 36 | 7900 | 0.700 | 5.53 | 18.0% |
| 48 | 12300 | 0.700 | 8.61 | 28.0% |
| 60 | 18200 | 0.700 | 12.74 | 41.4% |
| 72 | 25300 | 0.720 | 18.22 | 59.3% |
| Wash 1 | 1350 | 1.020 | 1.38 | |
| Wash 2 | 61 | 0.990 | 0.06 | |
| *Fine Ilmenite* | | | | |
| 0 | 2300 | 0.700 | 1.61 | 4.8% |
| 3 | 5000 | 0.700 | 3.50 | 10.5% |
| 6 | 5100 | 0.700 | 3.57 | 10.7% |
| 12 | 5400 | 0.700 | 3.78 | 11.3% |
| 24 | 6600 | 0.700 | 4.55 | 13.6% |
| 48 | 20000 | 0.700 | 14.00 | 42.0% |
| 60 | 24000 | 0.700 | 16.80 | 50.4% |
| 72 | 29300 | 0.815 | 23.88 | 76.3% |
| Wash 1 | 1550 | 0.995 | 1.54 | |
| Wash 2 | 44 | 1.000 | 0.04 | |

EXAMPLE 5
Addition of Carbon Source

Figure 6:
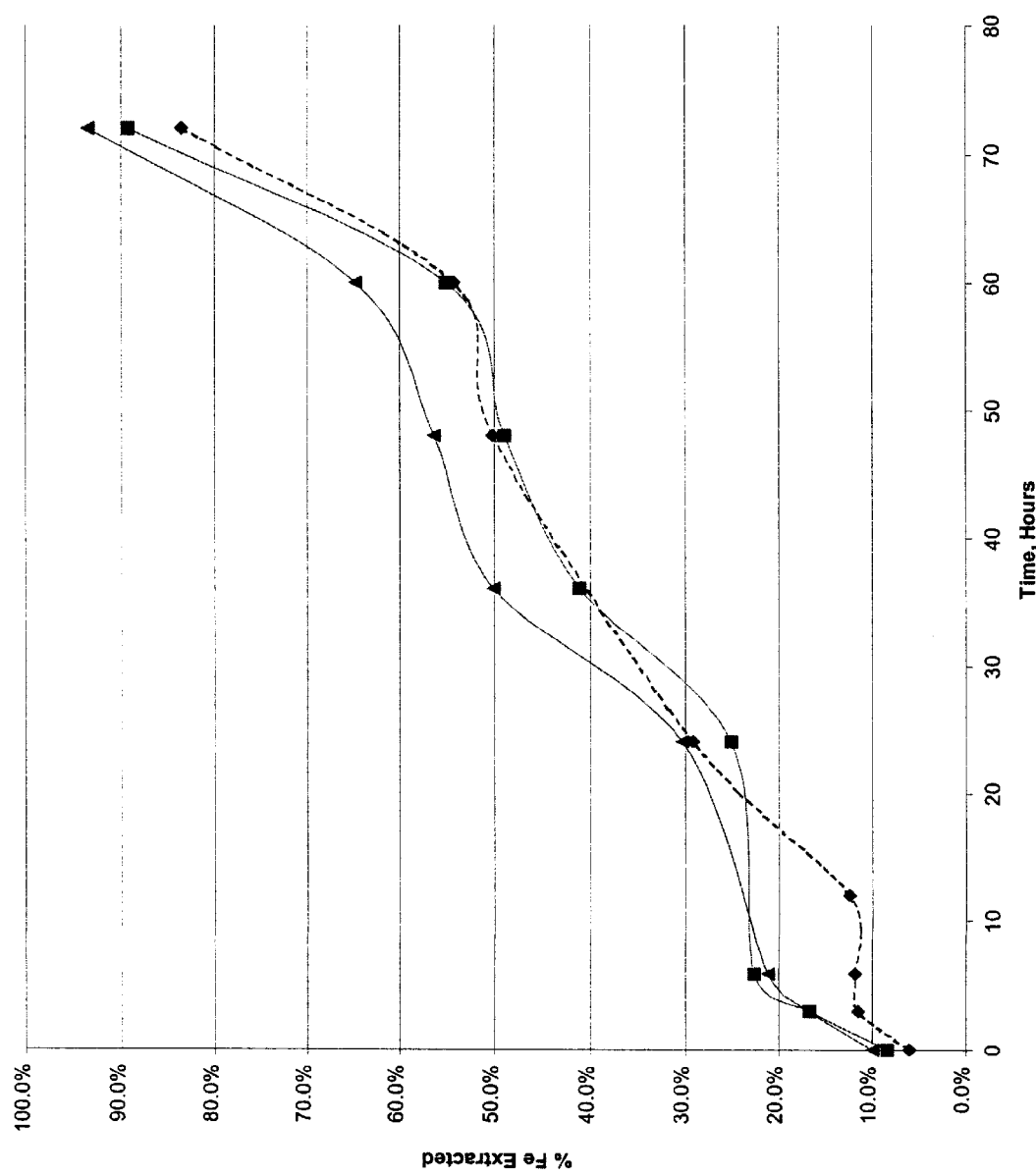
FIG. 6 shows the results of experiments evaluating the effect of adding a carbon source during the sulfuric acid leaching process.

The addition of a carbon source in the form of activated carbon or graphite speeds the kinetics of the leaching reaction. The ratios of carbon to ore tried were 1:2 and 1:1. The results of tests carried out at 100° C. with 120 grams per liter salt and 200 grams per liter sulfuric acid are shown in FIG. 6. The most cost effective carbon to ore ratio will depend on final leach conditions. A person skilled in the art, having the benefit of the current disclosure, can identify the optimal carbon to ore ratio for a particular process.

In a separate but analogous experiment to demonstrate the effect of the addition of a carbon source to the leaching of iron from ilmenite to leave a $TiO_2$ concentrate residue, a 150 gram per liter alkali metal halide solution was used, as opposed to the 120 grams per liter salt used in the aforementioned experiment. The experiment used ilmenite having a particle size wherein 100% of particles passed through a 75 micron screen. A varying amount of coconut shell activated carbon was placed in each container. The same carbon to sample ratios were evaluated as in the aforementioned experiment. The amounts were 0, 50 and 100 grams of carbon for carbon to sample ratios of 0, 1:2 and 1:1, respectively. The slurry was vigorously stirred for 72 hours and the iron concentration periodically monitored. The results are shown in Table 5. The leach with the 1:1 ratio of carbon to feed material had slightly better kinetics than the other two conditions.

TABLE 5

The Results of adding Carbon during the Sulphuric Acid Leaching Process

No Carbon Source

| Time | Fe | Volume | Fee Extraction | |
|---|---|---|---|---|
| Hours | mg/l | (liters) | gm | Cumulative |
| 0 | 3000 | 0.700 | 2.10 | 6.0% |
| 3 | 5700 | 0.700 | 3.00 | 11.5% |
| 6 | 5900 | 0.700 | 4.13 | 11.9% |
| 12 | 6200 | 0.700 | 4.34 | 12.5% |
| 24 | 14500 | 0.700 | 10.15 | 29.1% |
| 48 | 25000 | 0.700 | 17.50 | 50.3% |
| 60 | 27000 | 0.700 | 18.90 | 54.3% |
| 72 | 36500 | 0.740 | 27.01 | 83.6% |
| Wash 1 | 2060 | 0.995 | 2.05 | |
| Wash 2 | 60 | 1.010 | 0.06 | |

1:2 Carbon:Ilmenite

| Time | Fe | Volume | Fe Extraction | |
|---|---|---|---|---|
| Hours | mg/l | liters | gm | Cumulative |
| 0 | 4100 | 0.700 | 2.87 | 8.4% |
| 3 | 8200 | 0.700 | 5.74 | 16.7% |
| 6 | 11100 | 0.700 | 7.77 | 22.6% |
| 12 | 12300 | 0.700 | 8.61 | 25.1% |
| 24 | 20200 | 0.700 | 14.14 | 41.2% |
| 48 | 24000 | 0.700 | 16.80 | 49.9% |
| 60 | 27000 | 0.700 | 18.90 | 55.1% |
| 72 | 39300 | 0.695 | 27.31 | 89.3% |
| Wash 1 | 3240 | 0.980 | 3.18 | |
| Wash 2 | 150 | 1.000 | 0.15 | |

1:1 Carbon:Ilmenite

| Time | Fe | Volume | Fee Extraction | |
|---|---|---|---|---|
| Hours | mg/l | liters | gm | Cumulative |
| 0 | 4800 | 0.700 | 3.36 | 10.0% |
| 3 | 8000 | 0.700 | 5.60 | 16.7% |
| 6 | 10100 | 0.700 | 7.07 | 21.1% |
| 12 | 14500 | 0.700 | 10.15 | 30.3% |
| 24 | 24000 | 0.700 | 16.80 | 50.2% |
| 48 | 27000 | 0.700 | 16.90 | 56.4% |
| 60 | 31000 | 0.700 | 21.70 | 64.8% |

TABLE 5-continued

The Results of adding Carbon during the Sulphuric Acid Leaching Process

| 72 | 45400 | 0.550 | 24.97 | 93.5% |
|---|---|---|---|---|
| Wash 1 | 6040 | 0.990 | 5.98 | |
| Wash 2 | 355 | 0.990 | 0.35 | |

EXAMPLE 6

Leaching of Copper and Nickel from Laterite Ore with a Sulfuric Acid-Halide-Carbon System This ore has an assay head of 2.36% Co, 1.26% Ni. 11.00% Fe, 10.80% Mn. A sample of 100 grams of ground, −200 mesh ore was first treated with 200 grams of NaCl dissolved in 650 grams of water. The water was evaporated on a hot plate. This procedure is a speeded up simulation of spaying a heap of ore with a salt solution and letting it evaporate naturally. The ore-salt solids were then slurried in 200 grams of sulfuric acid in 700 grams of water solution. The stirred slurry was brought to 100° C. on a stirring hot plate, and then 100 grams of +65 mesh, coconut shell, activated carbon was added. The test was run for 48 hours with aliquots of solution taken at 1, 4, 6, and 24 hours. The results are shown in Table 6. The extraction of cobalt was probably complete within the first hour. The cobalt was probably precipitated by the ionic strength of the solution and not recovered until the wash solution dissolved it. After 120 hours of leaching the ore under the same conditions except for omitting the NaCl the Co recovery was 63.9% and the Ni recovery was 58.2%.

TABLE 6

Percent Extracted from Laterite Ore Leach

| Time (hrs) | Co | Ni | Fe | Mn |
|---|---|---|---|---|
| 1 | 81.5% | 67.5% | 18.8% | 63.4% |
| 2 | 81.5% | 78.2% | 25.5% | 71.0% |
| 4 | 81.5% | 85.5% | 31.5% | 71.0% |
| 6 | 81.5% | 84.8% | 36.0% | 72.6% |
| 24 | 85.0% | 87.5% | 54.8% | 73.3% |
| 48 | 81.5% | 86.2% | 67.5% | 71.0% |
| Wash 1 | 13.1% | 12.9% | 18.5% | 11.5% |
| Wash 2 | 5.4% | 0.6% | 2.2% | 0.4% |
| Final Liquors: | 100.0% | 99.6% | 88.2% | 82.9% |

EXAMPLE 7

Effect of Alkali Metal Halide on the Leaching of Nickel and Cobalt from Laterite 1

Experiments were conducted on two samples of 100 grams of laterite-1 feed, comprising 1.0 percent nickel and 0.1 percent cobalt of a particle size of approximately 80% passing 75 microns.

In the first experiment the 100 g sample was leached with 200 grams of sulfuric acid, 800 grams of water and no alkali halide at 100° C.

In the second experiment the 100 g sample was leached with 200 grams of sulfuric acid, 800 grams of water at 100° C., and 200 grams of alkali metal halide (sodium chloride).

Figure 7:
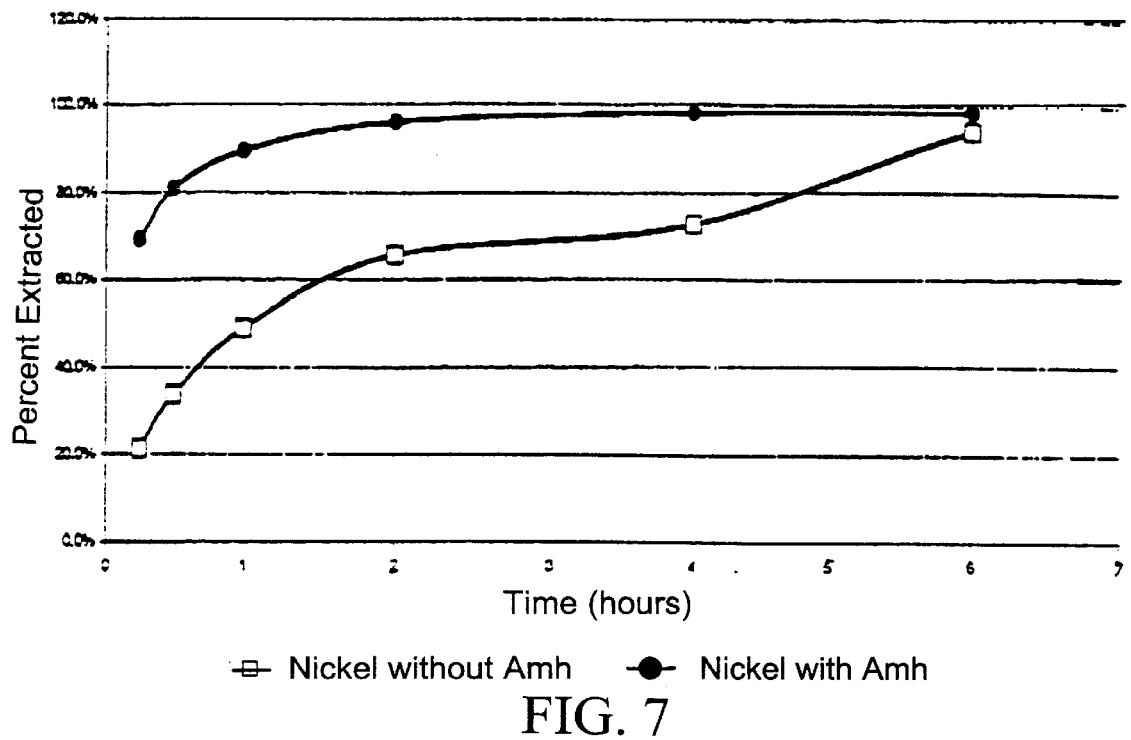
FIG. 7 shows the results of experiments evaluating the effect of an alkali metal halide on the sulfuric acid leaching process of leaching nickel from an initial laterite feed (Laterite-1).
Figure 8:
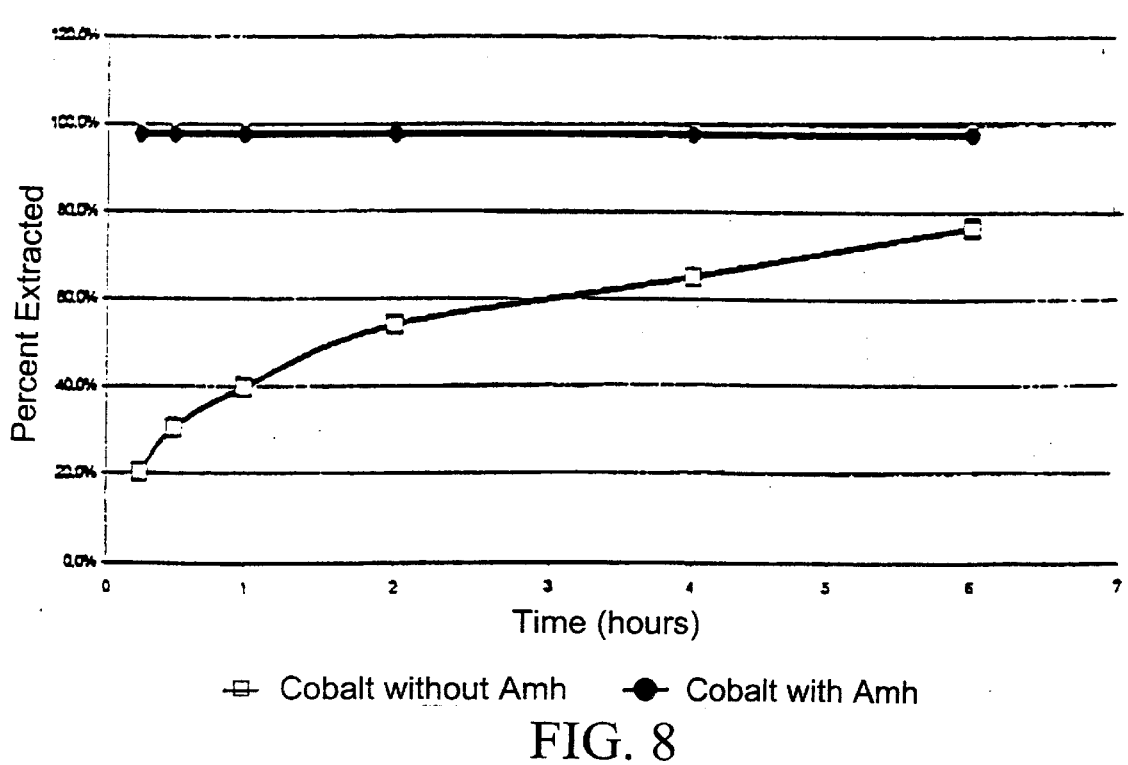
FIG. 8 shows the results of experiments evaluating the effect of an alkali metal halide on the sulfuric acid leaching process of leaching cobalt from an initial laterite feed (Laterite-1).

Each experiment was run for a total of 6 hours with solution sampling being carried out at 0.25, 0.5, 1.0, 2.0, 4.0, and finally 6.0 hours. The results are shown in Table 7 and FIGS. 7 and 8. The second experiment that utilized the halide showed significantly better results for both nickel and cobalt, and particularly cobalt.

TABLE 7

Leaching of Nickel and Cobalt from Laterite-1

| | mg/l | | Volume | Ni | | Co | |
|---|---|---|---|---|---|---|---|
| | | | | | Cumulative | | Cumulative |
| Time Hours | Ni | Co | liters | mg | Extraction | mg | Extraction |
| *No Alkali Metal Halide* | | | | | | | |
| 0.25 | 240.0 | 20.0 | 0.010 | 2.40 | 21.3% | 0.20 | 20.3% |
| 0.5 | 380.0 | 30.0 | 0.010 | 3.80 | 33.7% | 0.30 | 30.5% |
| 1 | 550.0 | 39.0 | 0.010 | 5.50 | 48.8% | 0.39 | 39.6% |
| 2 | 740.0 | 53.0 | 0.010 | 7.40 | 65.8% | 0.53 | 53.8% |
| 4 | 820.0 | 64.0 | 0.010 | 8.20 | 72.7% | 0.64 | 65.0% |
| 6 hr PLS | 1060.0 | 75.0 | 0.780 | 826.80 | 94.0% | 58.50 | 78.2% |
| Wash 1 | 116.0 | 40.0 | 0.670 | 77.72 | | 26.80 | |
| Wash 2 | 12.0 | 1.3 | 0.700 | 8.40 | | 0.91 | |
| *Included Alkali Metal Halide* | | | | | | | |
| 0.25 | 741.7 | 100.0 | 0.010 | 7.42 | 69.4% | 1.00 | 97.7% |
| 0.5 | 867.2 | 100.0 | 0.010 | 8.67 | 81.2% | 1.00 | 97.7% |
| 1 | 958.4 | 100.0 | 0.010 | 9.58 | 89.7% | 1.00 | 97.7% |
| 2 | 1026.9 | 100.0 | 0.010 | 10.27 | 96.1% | 1.00 | 97.7% |
| 4 | 1049.7 | 100.0 | 0.010 | 10.50 | 98.3% | 1.00 | 97.7% |
| 6 hr PLS | 1050.0 | 100.0 | 0.765 | 803.25 | 98.3% | 76.50 | 97.7% |
| Wash 1 | 103.8 | 10.0 | 0.670 | 69.57 | | 6.70 | |
| Wash 2 | 60.5 | 5.7 | 0.590 | 35.68 | | 3.36 | |

EXAMPLE 8

Effect of Alkali Metal Halide on the Leaching of Nickel and Cobalt from Laterite-2

Experiments were conducted on two samples of 100 grams of laterite-2 comprising 1.1 percent nickel and 0.1 percent cobalt feed of a particle size of approximately 80% passing 75 microns.

In the first experiment the 100 g sample was leached with 200 grams of sulfuric acid, 800 grams of water and no alkali halide at 100° C.

In the second experiment the 100 g sample was leached with 200 grams of sulfuric acid, 800 grams of water at 100° C., and 200 grams of alkali metal halide (sodium chloride).

Figure 9:
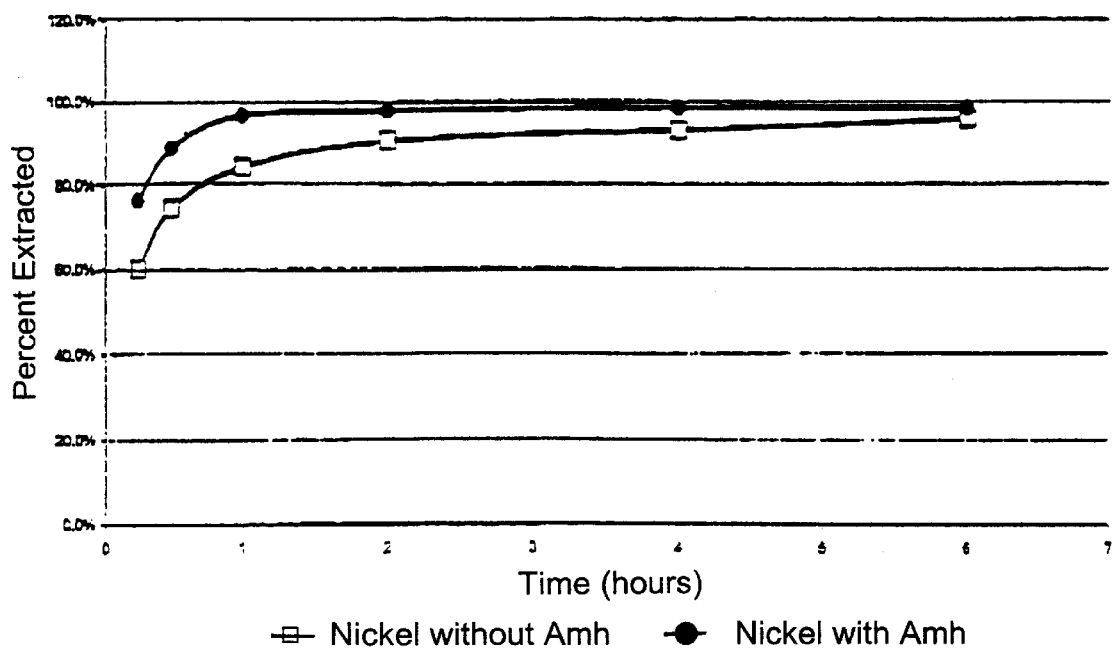
FIG. 9 shows the results of experiments evaluating the effect of an alkali metal halide on the sulfuric acid leaching process of leaching nickel from a second laterite feed (Laterite-2).
Figure 10:
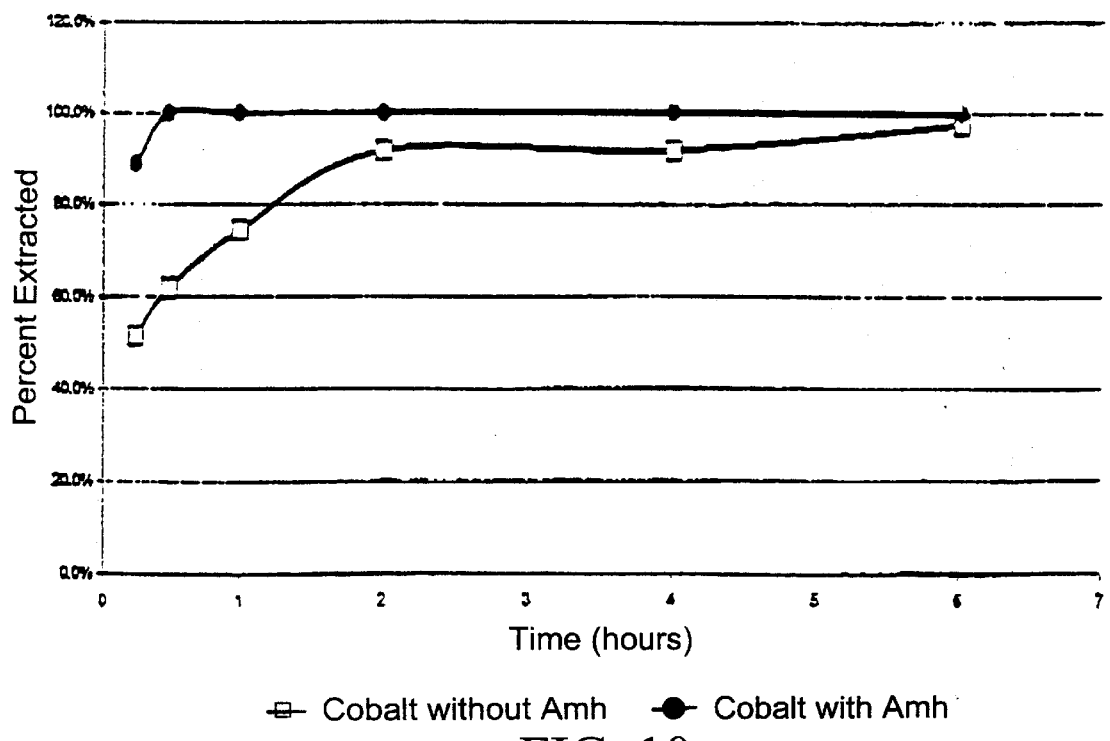
FIG. 10 shows the results of experiments evaluating the effects of an alkali metal halide on the sulfuric acid leaching process of leaching cobalt from a second laterite feed (Laterite-2).

Each experiment was run for a total of 6 hours with solution sampling being carried out at 0.25, 0.5, 1.0, 2.0, 4.0, and finally 6.0 hours. The results are shown in Table 8 and FIGS. 9 and 10. The alkali metal halide (sodium chloride) test showed significantly better results for both nickel and cobalt, particularly with regard to the speed with which full (100%) dissolution is achieved.

TABLE 8

Leaching of Nickel and Cobalt from Laterite-2

| | mg/l | | Volume | Ni | | Co | |
|---|---|---|---|---|---|---|---|
| | | | | | Cumulative | | Cumulative |
| Time Hours | Ni | Co | liters | mg | Extraction | mg | Extraction |
| *No Alkali Metal Halide* | | | | | | | |
| 0.25 | 738.9 | 45.0 | 0.010 | 7.39 | 60.0% | 0.45 | 51.6% |
| 0.5 | 915.3 | 54.0 | 0.010 | 9.15 | 74.3% | 0.54 | 61.9% |
| 1 | 1036.6 | 65.0 | 0.010 | 10.37 | 84.2% | 0.65 | 74.5% |
| 2 | 1113.8 | 80.0 | 0.010 | 11.14 | 90.4% | 0.80 | 91.7% |
| 4 | 1146.9 | 80.0 | 0.010 | 11.47 | 93.1% | 0.80 | 91.7% |
| 6 hr PLS | 1180.0 | 85.0 | 0.725 | 855.50 | 95.8% | 61.63 | 97.4% |
| Wash 1 | 264.7 | 21.0 | 0.530 | 140.28 | | 11.13 | |
| Wash 2 | 51.8 | 4.1 | 0.695 | 36.02 | | 2.85 | |
| *Included Alkali Metal Halide* | | | | | | | |
| 0.25 | 906.5 | 80.0 | 0.010 | 9.07 | 76.4% | 0.80 | 88.9% |
| 0.5 | 1054.1 | 90.0 | 0.010 | 10.54 | 88.8% | 0.90 | 100.0% |
| 1 | 1149.0 | 90.0 | 0.010 | 11.49 | 96.8% | 0.90 | 100.0% |
| 2 | 1159.5 | 90.0 | 0.010 | 11.60 | 97.7% | 0.90 | 100.0% |
| 4 | 1170.0 | 90.0 | 0.010 | 11.70 | 98.6% | 0.90 | 100.0% |
| 6 hr PLS | 1170.0 | 90.0 | 0.750 | 877.50 | 98.6% | 67.50 | 100.0% |
| Wash 1 | 177.1 | 13.0 | 0.800 | 141.67 | | 10.40 | |
| Wash 2 | 25.3 | 2.1 | 0.795 | 9.07 | | 1.67 | |

The above two experiments demonstrate the results for leaching both the nickel and cobalt from two different nickel-cobalt laterite samples.

The following procedure steps have been applied separately to each of the laterite samples:

Step 1. A condenser is placed on the Erlenmeyer containing the slurry comprising the prescribed solution and laterite feed;

Step 2. The slurry is stirred vigorously with a magnetic stirrer for the duration of the test with the temperature maintained at 100° C.;

Step 3. The test is sampled at predetermined times, eg., 15 minutes, 30 minutes, etc., by pipetting 10 ml of the hot slurry from the Erlenmeyer into a centrifuge tube and centrifuge at 4,000 rpm for 5 minutes;

Step 4. The centrifuged timed leach solution is transferred into a sample tube for later analysis;

Step 5. 10 ml of make-up leach solution is used to wash the centrifuged residue back into the Erlenmeyer, while the Erlenmeyer continues to be agitated at 100° C. on the hot plate;

Step 6. At the end of the test (eg., 6 hours) the contents of the Erlenmeyer is poured into two centrifuge tubes, using an additional very small amount of distilled water to wash out any residue remaining on the inside lip of the Erlenmeyer, and then centrifuged;

Step 7. The centrifuged liquid contents (pregnant leach solution—PLS) from both centrifuge tubes is decanted into a graduated cylinder and allow to cool;

Step 8. Then having read the volume of PLS solution, approximately 20 ml is transferred into a sample tube and analysed for nickel and cobalt;

Step 9. Calculations are conducted to determine nickel and cobalt contents of the liquors and comparisons made with the respective elemental assay values of the laterite ore feed;

Step 10. Nickel and cobalt can be totally or partially removed from the leach liquor by the method that makes the most economic sense for any given plant. The methodologies available variously include, but are not limited to, precipitation of metallic salts by seeding, pH adjustment, or crystallisation; solvent extraction and electrowinning of elemental metal; and ion exchange.

EXAMPLE 9

Leaching of Silver

This example shows the leaching of silver from a copper refinery pilot plant's slimes. The test was conducted at 100° C. with 200 gram per liter sulfuric acid and 200 gram per liter NaCl. Samples of 50 grams of slimes were leached in 500 milliliters of solution. The leaching was conducted for 48 hours. The results are shown in the Table 9.

TABLE 9

Results of 48 hour Leaching of Silver from Refinery Slimes

| Sample | Head Ag, ppm | Liquor Ag, ppm | % Recovery |
|---|---|---|---|
| Slime 1 | 14.75 | 18 | 80 |
| Slime 2 | 58.9 | 59 | 65 | ppm = parts per million

EXAMPLE 10

Leaching of Molybdenum

A sample of molybdenum oxide ore with a head grade of 0.070% Mo was ground to minus 200 mesh and leached with agitation for 48 hours at room temperature with a solution of 100 grams per liter sulfuric acid and 100 grams per liter sodium chloride. This leach recovered 89% of the molybdenum in the sample.

Another sample of unground ore from the same mine ore was screened to select the minus 18,850 plus 833 micron (minus ¾ inch plus 20 mesh) fraction. This fraction was placed in a column and the same 100 g/l sulfuric acid, 100 g/l sodium chloride was applied to the ore for 56 days at 0.05 gallons per minute per square foot The leach solution was recirculated continuously. This leach scheme obtained 82% recovery of the molybdenum.

EXAMPLE 11

Two Stage Leaching of Different Metals into Two Separate Leach Liquors

An oxide copper ore sample, ground to minus 200 mesh, with a head grade of 0.91 % Cu, 2.0 grams/ton Au, and 2.4 grams/ton Ag was leached with 100 gram per liter sulfuric acid for 72 hours in a stirred vessel at room temperature. The solid residue was then filtered and put into another vessel and leached for 30 hours at room temperature with a solution of 50 gram per liter of potassium bromide and enough sulfuric acid (6 ml) to adjust the pH to 1.0 with agitation. The results are shown in Table 10.

TABLE 10

| | Percent Recovery in Stage | | |
|---|---|---|---|
| Leach Stage | Cu | Au | Ag |
| 100 g/l $H_2SO_4$ | 71 | 0 | 0 |
| KBr—$H_2SO_4$ | 28 | 100 | 100 |

A person skilled in the art, having the benefit of the teachings of this disclosure, can adjust the acid concentration and temperature to achieve complete recovery of the copper in the first stage while maintaining excellent recovery of the Au and Ag in the second stage. The subject method can also be readily adapted to heap leaching.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:

1. A method for recovering titanium oxide from a titanium and iron-containing mineral feed, said method comprising:
   (a) solubilizing, at about atmospheric pressure, said titanium and said iron by leaching said mineral feed with an acidic solution comprising sulfuric acid at a concentration between about 20 grams/liter and 500 grams/liter;
   (b) selectively precipitating one or more titanium oxide; and
   (c) recovering said precipitated titanium oxide.

2. The method according to claim 1, wherein said titanium oxide comprises titanium dioxide.

3. The method according to claim 1, wherein said mineral feed is selected from the group consisting of ore, soil, concentrate, slag and residue.

4. The method according to claim 1, wherein said mineral feed is selected from the group consisting of ilmenite ($FeTiO_3$), leucoxene, perovskite ($CaTiO3$) and titano magnetite.

5. The method according to claim 4, wherein said mineral feed is ilmenite ($FeTiO_3$).

6. The method according to claim 1, wherein the concentration of said sulfuric acid is between about 150 grams/liter and about 250 grams/liter.

7. The method according to claim 1, wherein the concentration of said sulfuric acid is about 200 grams/liter.

8. The method according to claim 1, wherein said solubilization step is carried out in the presence of an alkali metal halide.

9. The method according to claim 8, wherein said alkali metal halide is selected from the group consisting of NaCl, KCl, NaBr and KBr.

10. The method according to claim 9, wherein said alkali metal halide is NaCl.

11. The method according to claim 8, wherein said solubilization step is carried out in the presence of an alkali metal halide to mineral feed ratio of from about 1:1 to about 2:1.

12. The method according to claim 8, wherein said alkali metal halide to mineral feed ratio is from about 1:1 to about 1.5:1.

13. The method according to claim 8, wherein said alkali metal halide to mineral feed ratio is about 1.2:1.

14. The method according to claim 1, wherein said solubilization step is carried out in the presence of a source of carbon.

15. The method according to claim 1, wherein said precipitation step is carried out using a technique selected from the group consisting of crystal seeding, concentration, pH adjustment and temperature control.

16. The method according to claim 1, further comprising recovering said iron.

17. The method according to claim 1, wherein said mineral feed is ground into smaller particles.

18. The method according to claim 17, wherein said particles are capable of passing through a 75 micron sieve after grinding.

19. The method according to claim 1, wherein said solubilization step is carried out at a temperature of about 80° C. to about 120° C.

20. The method according to claim 1, wherein said solubilization step is carried out at a temperature of about 90° C. to about 100° C.

21. The method according to claim 1, wherein said solubilization step is carried out at a temperature of about 100° C.

22. The method according to claim 1, wherein said solubilization step is carried out for a duration of from about 50 hours to about 120 hours.

23. The method according to claim 1, wherein said solubilization step is carried out for a duration of from about 60 hours to about 100 hours.

24. The method according to claim 8, wherein said alkali metal halide is added as a solution to said mineral feed prior to the solubilization step and said alkali metal halide solution is allowed to evaporate or is boiled down to dryness.

25. A method for recovering a transition metal other than titanium from a mineral feed bearing said transition metal, said method comprising:
(a) solubilizing at about atmospheric pressure, said transition metal by leaching said mineral feed with an acid solution comprising sulfuric acid at a concentration between about 20 grams/liter and 500 grams/liter;
(b) selectively precipitating one or more of said transition metal; and
(c) recovering one or more of said transition metal, wherein said transition metal is selected from the group consisting of cobalt, nickel, molybdenum, lead, and gold.

26. The method according to claim 25, wherein said one or more transition metal comprises two transition metals, wherein said two transition metals are nickel and cobalt.

27. The method according to claim 25, wherein said mineral feed comprises laterite.

28. The method according to claim 25, wherein the concentration of said sulfuric acid is between about 150 grams/liter and about 250 grams/liter.

29. The method according to claim 25, wherein the concentration of said sulfuric acid is about 200 grams/liter.

30. The method according to claim 25, wherein said solubilization step is carried out in the presence of an alkali metal salt.

31. The method according to claim 30, wherein said alkali metal salt is selected from the group consisting of alkali metal halide, alkali metal nitrate, alkali metal nitrite, alkali metal sulfite and alkali metal thionite.

32. The method according to claim 30, wherein said alkali metal salt is an alkali metal halide selected from the group consisting of NaCl, KCl, NaBr and KBr.

33. The method according to claim 32, wherein said alkali metal halide is NaCl.

34. The method according to claim 30, wherein said alkali metal salt is selected from the group consisting of sodium sulfite, sodium metabisulfite, sodium bisulfite, and sodium dithionite.

35. The method according to claim 30, wherein said solubilization step is carried out in the presence of an alkali metal salt to mineral feed ratio of from about 1:1 to about 2:1.

36. The method according to claim 30, wherein said alkali metal halide to mineral feed ratio is from about 1:1 to about 1.5:1.

37. The method according to claim 30, wherein said alkali metal halide to mineral feed ratio is about 1.2:1.

38. The method according to claim 25, wherein said solubilization step is carried out in the presence of a source of carbon.

39. The method according to claim 25, wherein said precipitation step is carried out using a technique selected from the group consisting of crystal seeding, concentration, pH adjustment and temperature control.

40. The method according to claim 25, wherein said mineral feed is selected from the group consisting of ore, soil, concentrate, slag and residue.

41. The method according to claim 25, wherein said mineral feed is ground into smaller particles.

42. The method according to claim 41, therein said particles are capable of passing through a 75 micron sieve after grinding.

43. The method according to claim 25, wherein said solubilization step is carried out at a temperature of about 80° C. to about 120° C.

44. The method according to claim 25, wherein said solubilization step is carried out at a temperature of about 90° C. to about 100° C.

45. The method according to claim 25, wherein said solubilization step is carried out at a temperature of about 100° C.

46. The method according to claim 25, wherein said solubilization step is carried out for a duration of from about 50 hours to about 120 hours.

47. The method according to claim 25, wherein said solubilization step is carried out for a duration of from about 60 hours to about 100 hours.

48. The method according to claim 30, wherein said alkali metal salt is added as a solution to said mineral feed prior to the solubilization step and said alkali metal salt solution is allowed to evaporate or is boiled down to dryness.

49. A method for consecutive recovery of multiple transition metals from a mineral feed bearing said transition metals, said method comprising:
   (a) solubilizing a first transition metal by leaching said mineral feed with an acid solution, whereby said mineral feed becomes separated into said first transition metal and a feed residue, said feed residue bearing at least a second transition metal;
   (b) selectively precipitating said first transition metal;
   (c) solubilizing at least said second transition metal by leaching said feed residue with a second acid solution additionally comprising an alkali metal salt; and
   (d) selectively precipitating at least said second transition metal.

50. The method according to claim 49, wherein said first acid solution is a halide acid.

51. The method according to claim 50, wherein said halide acid is selected from the group consisting of hydrochloric acid and hydrobromic acid.

52. The method according to claim 49, wherein said first acid solution comprises sulfuric acid.

53. The method according to claim 49, wherein said second acid solution comprises a halide acid.

54. The method according to claim 53, wherein said halide acid is selected from the group consisting of hydrochloric acid and hydrobromic acid.

55. The method according to claim 49, wherein said second acid solution comprises sulfuric acid.

56. The method according to claim 49, wherein said alkali metal salt of step (c) is selected from the group consisting of alkali metal halide, alkali metal nitrate, alkali metal nitrite. alkali metal sulfite and alkali metal thionite.

57. The method according to claim 49, wherein said alkali metal salt of step (c) is an alkali metal halide selected from the group consisting of NaCl, KCl, NaBr and KBr.

58. The method according to claim 57, wherein said alkali metal halide is KBr.

59. The method according to claim 49 wherein said alkali metal salt of step (c) is selected from the group consisting of sodium sulfite, sodium metabisulfite, sodium bisulfite, and sodium dithionite.

60. The method according to claim 49, wherein said first transition metal is selected from the group consisting of cobalt, nickel, copper, molybdenum, lead, zinc, gold and silver.

61. The method according to claim 60, wherein said first transition metal is copper.

62. The method according to claim 49, wherein said second transition metal is selected from the group consisting of cobalt, nickel, copper, molybdenum, lead, zinc, gold and silver.

63. The method according to claim 62, wherein said second transition metal is gold or silver.

64. The method according to claim 49, wherein said feed residue bears a third transition metal, step (c) further comprises solubilizing said third transition metal, and step (d) further comprises selectively precipitating said third transition metal.

65. The method according to claim 64, wherein said third transition metal is selected from the group consisting of cobalt, nickel, copper, molybdenum, lead, zinc, gold and silver.

66. The method according to claim 65, wherein said third transition metal is gold or silver.

67. The method according to claim 49, wherein said mineral feed is selected from the group consisting of ore, soil, concentrate, slag and residue.

68. The method according to claim 49, wherein said solubilization steps (a) and (c) are carried out at room temperature.

69. The method according to claim 49, wherein each of said solubilization steps (a) and (c) are carried out for a duration of from about 30 hours to about 120 hours.

70. The method according to claim 49, wherein said step (a) is carried out for a duration of about 72 hours and said step (c) is carried out for a duration of about 30 hours.

71. The method according to claim 49, wherein said mineral feed is ground into smaller particles.

72. The method according to claim 71, wherein said particles are capable of pass through a −200 mesh sieve.

73. The method according to claim 49, wherein said solubilization steps (a) and (c) are carried out in the presence of a source of carbon.

74. A method for recovering a transition metal other than titanium from a mineral feed bearing said transition metal, said method comprising:
   (a) solubilizing at about atmospheric pressure, said transition metal by leaching said mineral feed with an acid solution comprising sulfuric acid at a concentration between about 20 grams/liter and 500 grams/liter;
   (b) selectively precipitating one or more of said transition metal; and
   (c) recovering one or more of said transition metal; wherein said solubilization step is carried out in the presence of a source of carbon.

75. The method according to claim 74, wherein said transition metal is selected from the group consisting of cobalt, nickel, molybdenum, lead, zinc, gold and silver.

76. The method according to claim 75, wherein said one or more transition metal comprises two transition metals, wherein said two transition metals are nickel and cobalt.

77. The method according to claim 74, wherein said mineral feed comprises laterite.

78. The method according to claim 74, wherein the concentration of said sulfuric acid is between about 150 grams/liter and about 25 grams/liter.

79. The method according to claim 78, wherein the concentration of said sulfuric acid is about 200 grams/liter.

80. The method according to claim 74, wherein said solubilization step is carried out in the presence of an alkali metal salt.

81. The method according to claim 80, wherein said alkali metal salt is selected from the group consisting of alkali metal halide, alkali metal nitrate, alkali metal nitrite, alkali metal sulfite and alkali metal thionite.

82. The method according to claim 80, wherein said alkali metal salt is an alkali metal halide selected from the group consisting of NaCl, KCl, NaBr and KBr.

83. The method according to claim 82, wherein said alkali metal halide is NaCl.

84. The method according to claim 80, wherein said alkali metal salt is selected from the group consisting of sodium sulfite, sodium metabisulfite, sodium bisulfite, and sodium dithionite.

85. The method according to claim 80, wherein said solubilization step is carried out in the presence of an alkali metal salt to mineral feed ratio of from about 1:1 to about 2:1.

86. The method according to claim 80, wherein said alkali metal halide to mineral feed ratio is from about 1:1 to about 1.5:1.

87. The method according to claim 80, wherein said alkali metal halide to mineral feed ratio is about 1.2:1.

88. The method according to claim 74, wherein said precipitation step is carried out using a technique selected from the group consisting of crystal seeding, concentration, pH adjustment and temperature control.

89. The method according to claim 74, wherein said mineral feed is selected from the group consisting of ore, soil, concentrate, slag and residue.

90. The method according to claim 74, wherein said mineral feed is ground into smaller particles.

91. The method according to claim 90, wherein said particles are capable of passing through a 75 micron sieve after grinding.

92. The method according to claim 80, wherein said alkali metal salt is added as a solution to said mineral feed prior to the solubilization step and said alkali metal salt solution is allowed to evaporate or is boiled down to dryness.

93. A method for recovering a transition metal other than titanium from a mineral feed bearing said transition metal, said method comprising:
    (a) solubilizing at about atmospheric pressure, said transition metal by leaching said mineral feed with an acid solution comprising sulfuric acid at a concentration between about 20 grams/liter and 500 grams/liter;
    (b), selectively precipitating one or more of said transition metal; and
    (c) recovering one or more of said transition metal, wherein said mineral feed comprises laterite.

94. The method according to claim 93, in said transition metal is selected from the group consisting of cobalt, nickel, molybdenum, lead, zinc, gold and silver.

95. The method according to claim 94, wherein said one or more transition metal comprises two transition metals, wherein said two transition metals are nickel and cobalt.

96. The method according to claim 93, wherein the concentration of said sulfuric acid is between about 150 grams/liter and about 250 grams/liter.

97. The method according to claim 96, wherein the concentration of said sulfuric acid is about 200 grams/liter.

98. The method according to claim 93, wherein said solubilization step is carried out in the presence of an alkali metal salt.

99. The method according to claim 98, wherein said alkali metal salt is selected from the group consisting of alkali metal halide, alkali metal nitrate, alkali metal nitrite, alkali metal sulfite and alkali metal thionite.

100. The method according to claim 98, wherein said alkali metal salt is an alkali metal halide selected from the group consisting of NaCl, KCl, NaBr and KBr.

101. The method according to claim 100, wherein said alkali metal halide is NaCl.

102. The method according to claim 100, wherein said alkali metal salt is selected from the group consisting of sodium sulfite, sodium metabisulfite, sodium bisulfite, and sodium dithionite.

103. The method according to claim 100, wherein said solubilization step is carried out in the presence of an alkali metal salt to mineral feed ratio of from about 1:1 to about 2:1.

104. The method according to claim 100, wherein said alkali metal halide to mineral feed ratio is from about 1:1 to about 1.5:1.

105. The method according to claim 100, wherein said alkali metal halide to mineral feed ratio is about 1.2:1.

106. The method according to claim 93, wherein said solubilization step is carried out in presence of a source of carbon.

107. The method according to claim 93, wherein said precipitation step is carried out using a technique selected from the group consisting of crystal seeding, concentration, pH adjustment and temperature control.

108. The method according to claim 93, wherein said mineral feed is selected from the group consisting of ore, soil, concentrate, slag and residue.

109. The method according to claim 93, wherein said mineral feed is ground into smaller particles.

110. The method according to claim 109, wherein said particles are capable of passing through a 75 micron sieve after grinding.

111. The method according to claim 100, wherein said alkali metal salt is added as a solution to said mineral feed prior to the solubilization step and said alkali metal salt solution is allowed to evaporate or is boiled down to dryness.

* * * * *

UNITED STATES PATENT AND TRADEMARK OFFICE
CERTIFICATE OF CORRECTION

PATENT NO. : 6,471,743 B1
DATED : October 29, 2002
INVENTOR(S) : Tom L. Young et al.

It is certified that error appears in the above-identified patent and that said Letters Patent is hereby corrected as shown below:

<u>Column 23,</u>
Line 41, "to about 100° C." should read -- to about 110° C. --.

<u>Column 24,</u>
Line 56, "to about 100° C." should read -- to about 110° C. --.

<u>Column 26,</u>
Line 38, "about 25 grams/liter" should read -- about 250 grams/liter --.

<u>Column 27,</u>
Line 26, "in said transition" should read -- wherein said transition --.

Signed and Sealed this

Eighth Day of June, 2004

JON W. DUDAS
*Acting Director of the United States Patent and Trademark Office*